United States Patent
Webster et al.

(10) Patent No.: US 10,730,998 B2
(45) Date of Patent: Aug. 4, 2020

(54) BIO-BASED THERMOSETS

(71) Applicant: NDSU RESEARCH FOUNDATION, Fargo, ND (US)

(72) Inventors: Dean C. Webster, Fargo, ND (US); Songqi Ma, Ningbo (CN)

(73) Assignee: NDSU RESEARCH FOUNDATION, Fargo, ND (US)

( * ) Notice: Subject to any disclaimer, the term of this patent is extended or adjusted under 35 U.S.C. 154(b) by 185 days.

(21) Appl. No.: 15/758,181

(22) PCT Filed: Sep. 15, 2016

(86) PCT No.: PCT/US2016/051932
§ 371 (c)(1),
(2) Date: Mar. 7, 2018

(87) PCT Pub. No.: WO2017/048949
PCT Pub. Date: Mar. 23, 2017

(65) Prior Publication Data
US 2018/0244834 A1 Aug. 30, 2018

Related U.S. Application Data

(60) Provisional application No. 62/218,749, filed on Sep. 15, 2015, provisional application No. 62/315,981, filed on Mar. 31, 2016, provisional application No. 62/336,050, filed on May 13, 2016.

(51) Int. Cl.
*C08G 59/34* (2006.01)
*C08G 59/42* (2006.01)
*C08G 59/32* (2006.01)
*C08G 65/26* (2006.01)
*C08G 59/04* (2006.01)

(52) U.S. Cl.
CPC ......... *C08G 59/3236* (2013.01); *C08G 59/04* (2013.01); *C08G 59/42* (2013.01); *C08G 59/4207* (2013.01); *C08G 65/2615* (2013.01)

(58) Field of Classification Search
None
See application file for complete search history.

(56) References Cited

U.S. PATENT DOCUMENTS

| 3,020,250 | A | 2/1962 | Norwalk et al. |
| 3,496,119 | A | 2/1970 | Weller et al. |
| 6,150,436 | A | 11/2000 | Kastl et al. |
| 6,822,055 | B1 * | 11/2004 | Fischer ................. B29C 43/30 264/331.12 |
| 2014/0336301 | A1 * | 11/2014 | Webster ............... C08G 59/027 522/170 |

FOREIGN PATENT DOCUMENTS

| GB | 1101380 A | * | 1/1968 | ............ C08G 59/20 |
| WO | 2008/147473 A1 | | 12/2008 | |
| WO | 2011/092328 A1 | | 8/2011 | |
| WO | 2011/097484 A1 | | 8/2011 | |
| WO | 2014/176509 A1 | | 10/2014 | |

OTHER PUBLICATIONS

International Preliminary Report on Patentability in International Application No. PCT/US2016/051932, dated Mar. 29, 2018.
International Search Report and Written Opinion in International Application No. PCT/US2016/051932, dated Dec. 1, 2016.

* cited by examiner

*Primary Examiner* — Michael J Feely
(74) *Attorney, Agent, or Firm* — J.A. Lindeman & Co. PLLC

(57) ABSTRACT

The invention relates to novel curable bio-based thermosetting compositions of a) at least one highly-functional bio-based epoxy resin; and b) at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof and which are curable with water, an alcohol or a water and alcohol mixture. The bio-based thermosets of the invention may be free of VOCs and/or organic solvents. The bio-based thermosets of the invention can be used to form coatings, composites, adhesives, and films. Methods of making the bio-based thermosets of the invention are disclosed as are coating compositions and coated objects, such as coatings, composites, adhesives, and films, using the bio-based thermosets of the invention.

19 Claims, 23 Drawing Sheets

EPOXIDIZED SUCROSE SOYATE (ESS)

CITRIC ACID
$pK_{a1}$=3.13, $pK_{a2}$=4.76, $pK_{a3}$=6.39

TARTARIC ACID
$pK_{a1}$=2.98, $pK_{a2}$=4.34

MALIC ACID
$pK_{a1}$=3.40, $pK_{a2}$=5.11

OXALIC ACID
$pK_{a1}$=1.25, $pK_{a2}$=4.14

MALONIC ACID
$pK_{a1}$=2.83, $pK_{a2}$=5.69

GLUTARIC ACID
$pK_{a1}$=4.34, $pK_{a2}$=5.22

BEFORE DEGRADATION

DEGRADATION AT 90 °C FOR 20 MIN

DEGRADATION AT 90 °C FOR 235 MIN (c)

(d)

BIO-BASED THERMOSETS

CROSS-REFERENCE TO RELATED APPLICATIONS

This application claims priority to U.S. Provisional Application No. 62/218,749, filed Sep. 15, 2015; to U.S. Provisional Application No. 62/315,981, filed Mar. 31, 2016; and to U.S. Provisional Application No. 62/336,050, filed May 13, 2016. The disclosures of these provisional applications are incorporated herein by reference.

STATEMENT OF US GOVERNMENT SUPPORT

This invention was made with government support under IIA-1355466 awarded by the National Science Foundation (NSF). The US government has certain rights in the invention.

BACKGROUND OF THE INVENTION

Thermosetting resins show excellent thermal and mechanical properties, and outstanding dimensional stability due to their chemically cross-linked networks, and are irreplaceable in numerous applications such as high-performance coatings, adhesives, composites, rubbers, light-emitting diode lenses and solar cell encapsulants.[1] A combination of high hardness and good flexibility is a highly desired feature for polymer materials, especially thermosets in many applications; but it is typically difficult to achieve both properties simultaneously. Improving the flexibility of thermosets by decreasing the cross-link density or introducing flexible segments often results in softer materials. In contrast, increasing the cross-link density of thermosets or introducing rigid structures into the cross-linked network to achieve high hardness is often accompanied by increasing brittleness. Fogelstrom et al. reported a potential route to achieve hardness and flexibility at the same time via the introduction of nanoparticle fillers into the resin.[2] While the surface modification of the nanoparticle and complete dispersion of nanoparticle in the resin are indispensable to get the desired properties, this approach makes the process complex and increases the materials' cost.

Thermosetting resins have played an important role in industry due to their superior dimensional stability, good processability, and high formulation flexibility for tailoring the desired ultimate properties such as high modulus, strength, durability, and thermal and chemical resistance provided by high crosslink density.[3] Of all polymers produced, approximately 18% are thermosets with the worldwide annual production of more than 65 million tons during the period 2010-2015.[4] However, thermoset materials also have some drawbacks.

First of all, thermoset materials cannot be reshaped or reprocessed by heat or with solvent due to their covalently crosslinked networks.[5] So the recycling of thermosetting materials after use is much more arduous than thermoplastics (the recycling rate of thermoplastics has increased a lot in the past 20 years but is still unsatisfactory[6]). Also, with the rapid development of science and technology and the continuous improvement of living standards, the replacement cycle of many products such as electronics, which contain a significant amount of thermosets has been shortened. For instance, cell phones are used for <18 months and computers are used for <3 years before being replaced.[7] The difficulties of recycling thermosets and protecting electronic components during the thermoset removal process are motivating to develop recyclable thermosets. A similar situation exists for the recycling of fiber reinforced polymer composites which are made using valuable fibers and non-degradable thermosets.[8]

Another drawback in the production of many thermosets is the undesirable release of volatile organic compounds (VOCs) during the curing process since volatile solvents or monomers are often used to achieve favorable properties and low viscosity especially for thermosetting resin-based coatings and composites.[9]

Meanwhile, the sustainable development of materials requires us to reduce the consumption of nonrenewable resources and be able to recycle the materials after usage. So far, most thermosetting polymers are derived from fossil resources and thermoset materials cannot be reshaped or reprocessed by heat or with solvent due to their irreversible cross-linked networks, resulting in the difficult recycling of thermosets.[1,5]

The dependence on non-renewable resources (petroleum-based chemicals) is another issue for thermosetting resins. Recent years have witnessed the rapid development of bio-based polymers such as polylactic acid (PLA), polyethylene (PE), polybutylene succinate (PBS), polyhydroxyalkanoates (PHA), starch, cellulose, and natural fiber reinforced composites due to the increasing concern about the depletion of fossil reserves and greenhouse gas emissions.[4b, 11] In comparison with the above bio-based polymers especially thermoplastics, bio-based thermosets receive much less attention due to their lower market volume and more difficult recycling.[12]

SUMMARY OF THE INVENTION

This invention relates to novel bio-based thermosets comprising at least one highly funtional bio-based epoxy resin, such as those described in published PCT application WO 2011/097484, which is incorporated herein by reference, crosslinked with at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof and which are curable with the assistance of water, an alcohol or a water and alcohol mixture. The bio-based thermosets of the invention may be free of VOCs and/or organic solvents. The invention also relates to methods of preparing the bio-based thermosets comprising crosslinking at least one highly-functional bio-based epoxy resin with at least one water-soluble multifunctional carboxylic acid using water as a catalyst. The bio-based thermosets of the invention have excellent physical and mechanical properties and may be utilized in fully green coatings. The bio-based thermosets of the invention are also degradable and dissolvable in aqueous base solutions, such as NaOH aqueous solutions, and they are also thermally degradable. The bio-based thermosets of the invention can be used in various compositions, such as coatings, composites, adhesives, films, etc.

DESCRIPTION OF THE INVENTION

Figure 1:
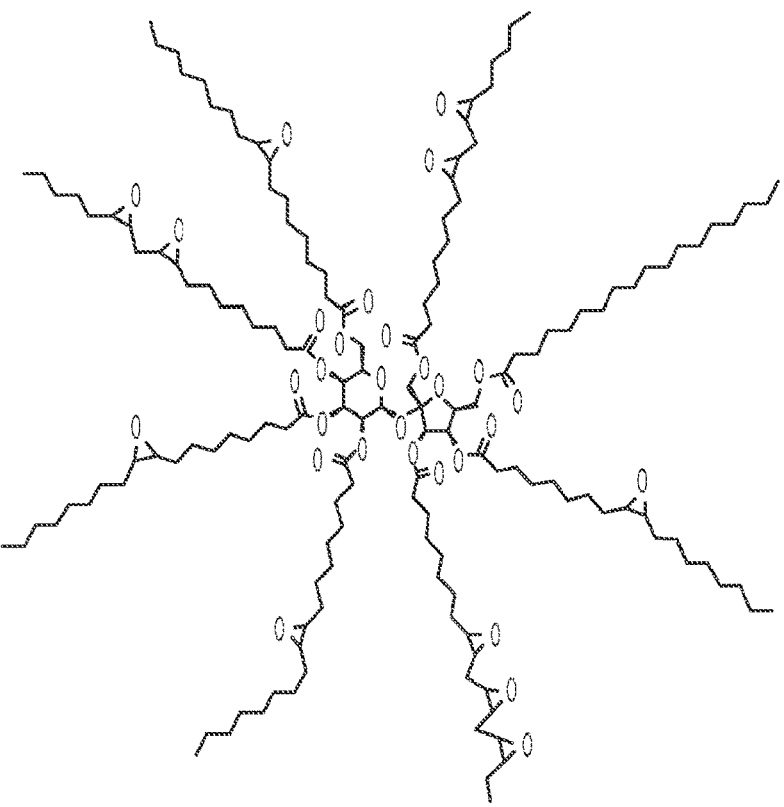
FIG. 1 depicts the chemical structures of epoxidized sucrose soyate (ESS) and water-soluble multifunctional carboxylic acids.
Figure 1:
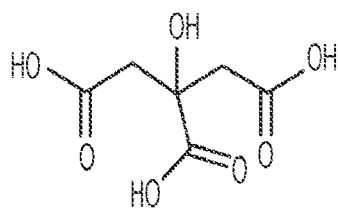
Figure 1:
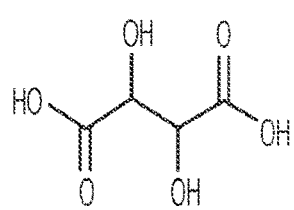
Figure 1:
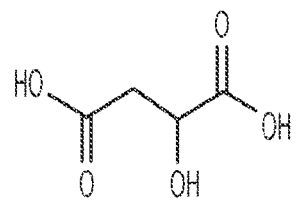
Figure 1:
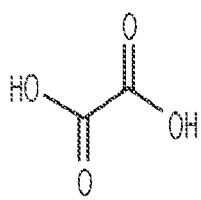
Figure 1:
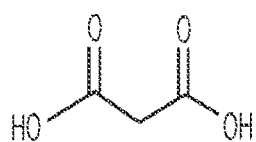
Figure 1:
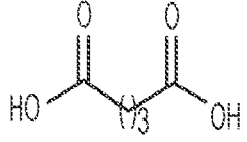

The invention relates curable bio-based thermosetting compositions comprising a) at least one highly-functional bio-based epoxy resin, and b) at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof. The bio-based thermosetting compositions are curable with water, a $C_1$-$C_3$ alcohol or a water and a $C_1$-$C_3$ alcohol mixture acting as a catalyst.

According to the invention, high-performance, degradable, VOC-free, organic solvent-free, fully bio-based thermosets can be prepared via water-assisted and/or alcohol-assisted crosslinking of the highly-functional bio-based epoxy resins, including, for example, epoxidized sucrose ester resins, such as epoxidized sucrose soyate, with at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof. Although many labile linkages such as acetal[13], disulfide[14], Schiff base[15] and nitrobenzene moieties[16], etc. can also provide degradability to polymers including thermosets, the most utilized and economic labile linkage is the ester bond. Ester bonds can be hydrolyzed by chemicals such as base solutions, acid solutions and enzymes, and secondary and tertiary esters linkages can be easily cleaved by thermal treatment.

Highly-functional, Bio-based Epoxy Resins

The highly-functional, bio-based epoxy resins that may be used in the invention are synthesized from the epoxidation of vegetable or seed oil esters of polyols having 4 or more hydroxyl groups/molecule, such as those described in published PCT application WO 2011/097484. As described, the highly-functional, bio-based epoxy resins are the reaction product of a polyol having 4 or more hydroxyl groups; and an ethylenically unsaturated fatty acid, optionally a saturated fatty acid, or mixtures thereof; where at least one ethylenically unsaturated group of the ethylenically unsaturated fatty acid is oxidized to an epoxy group. The polyol having 4 or more hydroxyl groups include, but are not limited to, pentaerithritol, di-trimethylolpropane, di-pentaerithritol, tri-pentaerithritol, sucrose, glucose, mannose, fructose, galactose, raffinose, copolymers of styrene and allyl alcohol, polyglycidol and poly(dimethylpropionic acid). The ethylenically unsaturated fatty acid, optionally a saturated fatty acid, or mixtures thereof may be a vegetable or seed oil. Examples of oils which may be used in the invention, include but are not limited to, corn oil, castor oil, soybean oil, safflower oil, sunflower oil, linseed oil, tall oil fatty acid, tung oil, vernonia oil, and mixtures thereof. Polyol esters of fatty acids, PEFA's, containing four or more vegetable oil fatty acid moieties per molecule can be synthesized by the reaction of polyols with 4 or more hydroxyl groups per molecule with either a mixture of fatty acids or esters of fatty acids with a low molecular weight alcohol, as is known in the art. The former method is direct esterification while the latter method is transesterification. The degree of esterification for the polyol may be varied. The polyol may be fully esterified, where substantially all of the hydroxyl groups have been esterified with the fatty acid, or it may be partially esterified, where only a fraction of the available hydroxyl groups have been esterified. Similarly, the degree of epoxidation may be varied from substantially all to a fraction of the available double bonds.

In one embodiment, the highly-functional bio-based epoxy resins used in a thermosetting compositon of the invention are epoxidized sucrose fatty acid esters, such as those described in published PCT application WO 2011/097484. As described in WO 2011/097484, epoxidized sucrose ester resins derived from different vegetable oils (coconut oil, corn oil, castor oil, soybean oil, safflower oil, sunflower oil, linseed oil, tall oil fatty acid, tung oil, vernonia oil, etc., and mixtures thereof) can be used in one embodiment of the invention. In a particular embodiment, the epoxidized sucrose ester of soybean oil (epoxidized sucrose soyate, ESS) is used in the invention.

As described in WO 2011/097484, epoxidized sucrose soyate (ESS) (see FIG. 1) may be synthesized by the epoxidation of sucrose ester resins of soybean oil fatty acid.[17] Due to its rigid sucrose core and highly-functionality, ESS cured with 4-methyl-1,2-cyclohexanedicarboxylic anhydride showed much higher modulus, glass transition temperature and tensile strength as well as solvent resistance than thermosets made using epoxidized soybean oil.[18] ESS has a high content of ester bonds in its structure, and curing with bio-based or natural carboxylic acids can produce more secondary ester bonds. For efficient degradability of thermosets using a hydrolysis mechanism, a high content of ester bonds is not sufficient. Hydrophilicity is also very important.[19] Thus, according to one embodiment of the invention, water-soluble natural acids may be used to crosslink epoxidized sucrose ester resins, such as ESS, in order to increase the hydrophilicity of the thermosets.

Carboxylic Acid Crosslinkers

A thermosetting composition of the invention contains at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof. To function as a crosslinker, the carboxylic acid must have more than one (at least two) carboxylic acid groups.

In one embodiment of the invention, the carboxylic acid crosslinker is a water-soluble multifunctional carboxylic acids having more than one carboxylic acid group. In one embodiment, the water-soluble multifunctional carboxylic acids are naturally-occurring, although non-naturally-occurring water-soluble multifunctional carboxylic acids may also be used. Water-soluble multifunctional carboxylic acids include, but are not limited to, citric acid, malic acid, tartaric acid, oxalic acid, malonic acid, glutaric acid, succinic acid, maleic acid (cis-butenedioic acid), fumaric acid (transbutenedioic acid), glutamic acid, itaconic acid, citraconic acid, mesaconic acid, aspartic acid, oxalacetic acid, adipic acid, pimelic acid, azelaic acid, suberic acid, 1,2,3-propanetricarboxylic acid, cis-aconitic acid, trans-aconitic acid, isocitric acid lactone, (+)-garcinia acid, 4,4'-phosphinicobis (butane-1,3-dicarboxylic acid), chelidamic acid, chelidonic acid, trans-(3-hydromuconic acid, trans-1,2-cyclohexanedicarboxylic acid, oxirane-2,3-dicarboxylic acid, 2,3-pyridinedicarboxylic acid, 2,4-pyridinedicarboxylic acid, 2,5-pyridinedicarboxylic acid, phenylmalonic acid, homophthalic acid, sebacic acid, 1,11-undecanedicarboxylic acid, dodecanedioic acid, hexadecanedioic acid, phthalic acid, isophthalic acid, terephthalic acid, trimeric acid, 1,2,4-benzenetricarboxylic acid, 2,5-furandicarboxylic acid, or mixtures thereof.

The ingredients of various fruit juices containing high amounts of water-soluble acids, including di- or multifunctional carboxylic acids, may be used as the water-soluble multifunctional carboxylic acids. As an example, citric acid is present in lemon, lime, and orange juices (about 48 g per liter of lemon juice, 45.8 g per liter of lime juice, and 9.10 g per liter of orange juice), malic acid occurs naturally in all fruit juices, is abundant in apple juice (8.477 g/L), and grape juice has a high content of tartaric acid (around 5.98 g/L).[20] Although epoxidized sucrose ester resins, such as ESS, and commercially used epoxy resins (except for a few special waterborne ones) are not miscible with water, it was surprisingly determined that highly concentrated aqueous solutions of natural acids could crosslink epoxidized sucrose ester resins, such as ESS. An aqueous citric acid solution has been reported as the curing agent for epoxidized soybean oil and epoxidized jatropha oil.[21] Thus, in one embodiment of the invention, the water-soluble multifunctional carboxylic acids may be combined with water to crosslink the highly-functional bio-based epoxy resins, including epoxidized sucrose ester resins, such as ESS, and obtain, for example, degradable, VOC-free, and 100% bio-based thermosets without adding organic solvents or catalysts.

In another embodiment of the invention, the carboxylic acid crosslinker may be a dicarboxylic acid oligomer synthesized from the melt reaction between a diol and a dicarboxylic acid or its anhydride. In one embodiment, a dicarboxylic acid oligomer synthesized from the melt reaction between a diol such as in one embodiment isosorbide and a dicarboxylic acid or its anhydride, such as maleic anhydride. In another embodiment, a dicarboxylic acid oligomer synthesized from the melt reaction between isosorbide or 1,3-propanediol and maleic anhydride.

Suitable diols which may be incorporated into an oligomer of the invention include isosorbide or 1,3-propanediol as mentioned above but also include other linear or branched $C_2$-$C_{10}$ aliphatic diols and $C_5$-$C_{15}$ cyclic or multicyclic diols. Exemplary diols that may be used in the invention include, but are not limited to, diethyleneglycol (DEG), 2-butyl-2-ethyl-1,3-propane diol (BEPD), ethylene glycol, 1,2-propane diol, 1,3-propane diol, 2-methyl-1,3-propane diol, 1,4-butanediol, 2,3-butanediol, 1,5-pentanediol, 1,6-hexanediol, 1,4-cyclohexanedimethanol, 1,3-cyclohexanedimethanol, isosorbide, isoidide, isomannide, neopentyl glycol (NPG), and mixtures thereof.

Isosorbide is one example of a 1,4:3,6 dianhydrohextol which may also be used in the dicarboxylic acid oligomer and which includes diols such as isoidide and isomannide. It has been reported that incorporating cyclohexylene moieties into the main chain of thermoplastics materials can improve the impact strength of the materials.[22] The improved impact strength is due to the enhanced molecular motions due to conformational transitions of cyclohexylene in the main chain.[22-23] Similarly, the conformational transitions of cyclohexylene moieties in thermosets can absorb energy which may be reflected in the β relaxation peak in the DMA curve, and improve the impact strength of the materials.[24] In addition, the conformation transition of the glucose ring (with an oxygen atom on the ring) can also occur under a small external force.[25] Zhang et al. has shown with single molecule force spectroscopy that non-planar ring structures including cyclohexylene (1 ring), Spiro-glycol (2 rings), tricyclodecanedimethanol (3 rings) and rosin-based (4 rings) linkages could endow molecular chains with improved elasticity which can absorb external stress.[26] Isosorbide (1,4:3, 6-Dianhydro-D-sorbitol) is an interesting renewable, bio-based diol monomer from starch; its rigid structure can give materials desired properties such as high $T_g$ and high hardness.[27] Thus, many efforts have been made to produce isosorbide-based polymers such as polyesters, polyamides, poly (ester amide)s, polyester imides, polyurethanes as well as other thermosets.[28] As with other non-planar rings such as cyclohexylene and glucose rings, the conformational transition of isosorbide ring should also occur under external energy. This intrinsic property of isosorbide may improve the segmental mobility of the thermosets and improve the overall flexibility of the materials. The functional group (secondary —OH) of isosorbide, however, has low reactivity,[28a] which has limited its development in polymer materials. Use of a dicarboxylic acid oligomer according to the invention overcomes such problems and allows isosorbide and other 1,4:3,6 dianhydrohextols to be used in the curable bio-based compositions of the invention.

Suitable dicarboxylic acids which may also be used in the invention include but are not limited to oxalic acid, maleic acid, malonic acid, succinic acid, oleic acid, glutaric acid, adipic acid, pimelic acid, phthalic acid (ortho-, meta-, or para-phthalic acid) as well as acid anhydrides thereof. In one embodiment, the dicarboxylic acid is succinic acid, succinic acid anhydride, maleic acid or maleic acid anhydride and in another embodiment it is maleic acid anhydride.

A dicarboxylic acid oligomer used in a thermoset synthesized from the melt reaction between a diol and a dicarboxylic acid or its anhydride. The molar ratio of carboxylic acid groups to hydroxyl groups is 2:1. The reaction maybe accomplished by mixing the reactants, then heating the mixture to achieve a melt with stirring and maintaining the melt until the reaction is complete.

As mentioned above, the carboxylic acid crosslinker may be a water-soluble multifunctional carboxylic acid, a dicarboxylic acid oligomer from a melt reaction between a diol and a dicarboxylic acid or its anhydride, and mixtures thereof. These mixtures include, for example, mixtures of water-soluble multifunctional carboxylic acids, mixtures of dicarboxylic acid oligomers, and mixtures of one or more water-soluble multifunctional carboxylic acids and one or more dicarboxylic acid oligomers.

Curable Bio-Based Thermosetting Compositions

As discussed above, the invention relates curable bio-based thermosetting compositions comprising a) at least one highly-functional bio-based epoxy resin, and b) at least one carboxylic acid crosslinker selected from the group consisting of a water-soluble multifunctional carboxylic acid, a dicarboxylic acid oligomer from a melt reaction between a diol and a dicarboxylic acid or its anhydride, and mixtures thereof. In a curable bio-based thermosetting composition of the invention, the ratio of highly-functional bio-based epoxy resin to carboxylic acid crosslinker present may be based on the chemical equivalent ratio between the epoxy groups present in the highly-functional bio-based epoxy resin and the carboxylic acid groups in the carboxylic acid crosslinker. In one embodiment the chemical equivalent ratio of epoxy to carboxylic acid may range from about 1:0.1 to about 1:1.3. In other embodiments, the chemical equivalent ratio may range from about 1:0.5 to about 1:1.1 or it may be about 1:1.

The bio-based thermosetting compositions of the invention may be cured with heating in the presence of water, a $C_1$-$C_3$ alcohol, or a mixture of water and a $C_1$-$C_3$ alcohol. The water and/or alcohol is added in an amount sufficient to cure the composition. The $C_1$-$C_3$ alcohol may be methanol, ethanol, propanol or iso-propanol. In a particular embodiment, the $C_1$-$C_3$ alcohol is ethanol. Water-assisted curing is typically used when the dicarboxylic acid crosslinker is a water-soluble multifunctional carboxylic acid. A mixture of water and a $C_1$-$C_3$ alcohol, e.g. ethanol, is generally used when the dicarboxylic acid curing agent is a dicarboxylic oligomer.

To understand the mechanism of the water-assisted curing reaction between the highly-functional bio-based epoxy resins, including epoxidized sucrose ester resins, such as ESS, and the naturally-occurring multifunctional acids, the reactivity of the natural acids toward ESS and the curing process was determined. As discussed below, water enabled the natural acids with high water solubility and acidity to be dispersed well in ESS and led to rapid crosslinking with ESS. Thus, water serves to solubilize the carboxylic acids and also activate the epoxy group for reaction with the carboxylic acid. In addition to the main ring-opening reaction between epoxy and carboxyl groups, it was also found that hydrolysis of epoxides, anhydride formation of carboxyl groups, and esterification of carboxyl groups with hydroxyl groups occurred during the curing process.

Due to the poor miscibility between a hydrophobic highly-functional, bio-based epoxy resin and a carboxylic acid crosslinker, phase separation may occur if the solvent evaporates. Thus, pre-reaction may be employed for the curable compositions. For the water-soluble mulfunctional carboxylic acid curing systems, the acids may be dissolved in deionized water at 80° C. before mixing with a highly-functional, bio-based epoxy resin, such as ESS. Due to the low miscibility between the acids and the highly-functional, bio-based epoxy resin, e.g. ESS, the acids would separate out from the curing systems and could not react with the highly-functional, bio-based epoxy resin, if the water evaporated. So the systems were pre-reacted in a closed container at about 70° C., about 80° C., or about 90° C. for a sufficient amount of time (about 2 to about 7 hours or about 5 hours) to obtain a transparent solution. When a dicarboxylic acid oligomer is used as a crosslinker the dicarboxylic acid oligomer may be dissolved in a water/$C_1$-$C_3$ alcohol solvent mixture, for example ethanol and deionized water, followed by mixing with a highly-functional, bio-based epoxy resin, such as ESS. In order to reduce the possibility of side reactions between the alcohol, e.g. ethanol; the highly-functional, bio-based epoxy resin, e.g. ESS; and the dicarboxylic acid oligomer, pre-reaction may carried out at low temperature (about 40° C. to about 65° C. or about 50° C.) for a sufficient amount of time (about 2 to about 7 hours or about 5 hours) to obtain a transparent solution. After the pre-reaction, the compositions may then be fully cured by heating at or above the pre-reaction temperature for a sufficient time to cure the composition. For example, the compositions may be cured at temperatures ranging from about 40° C. to about 175° C. or about 80° C. to about 150° C. and for a time ranging from about 1 hour to about 4 hours or from about 1 hour to about 3 hours, or for time of about 1 hour or for about 2 hours.

To release the water and/or $C_1$-$C_3$ alcohol during the curing process, the thermosets were prepared as free films and coatings. The thermoset films of the invention possess superior thermal and mechanical properties of the thermoset films as well as coating performance. As discussed in the examples below, the bio-based thermosets of the invention have excellent properties, such as, for example, good hardness, adhesion, and modulus, and the properties can be further tuned by adjusting the ratio of acid to epoxy groups. Finally, the thermal and chemical degradability of the thermosets were determined by TGA and immersion in NaOH aqueous solutions, respectively. As discussed below, the bio-based thermosets of the invention having water-soluble, multifunctional carboxylic acid crosslinkers are degradable by either aqueous base solutions or heat.

For the dicarboxylic acid oligomers a strategy employed here for the bio-based thermosets of the invention is to lengthen the cross-linker to reduce the cross-link density; meanwhile the rigid isosorbide structure was introduced to impart hardness to the networks and its potential conformational transitions could maintain and even improve the flexibility of the highly-functional, bio-based epoxy resin, e.g. ESS, network. A similar dicarboxylic acid from 1,3-propanediol and maleic anhydride was also synthesized. Water and ethanol were used to improve the miscibility and reactivity of the synthesized dicarboxylic acid oligomers and ESS. In order to release the ethanol and water during the curing process, the thermosets were prepared as free films and coatings. As discussed below in the examples, the films of the bio-based thermosets of the invention had excellent thermal and mechanical properties as well as the coating performance were investigated and could be both thermally and chemically degraded as shown by TGA and immersion in aqueous NaOH and HCl, respectively.

The bio-based thermosets of the invention can be used in various compositions, such as coatings, composites, adhesives, films, etc. The invention also relates to such compositions containing a bio-based thermoset of the invention and in particular to coating compositions. The coating compositions may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The coating composition of the invention may be cured thermally, at room temperature or at an elevated temperature.

Pigments and other additives known in the art to control coating rheology and surface properties can also be incorporated in a coating composition of the invention. For example a coating composition of the invention may further contain coating additives. Such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Solvents may also be added to the coating formulation in order to reduce the viscosity. Hydrocarbon, ester, ketone, ether, ether-ester, alcohol, or ether-alcohol type solvents may be used individually or in mixtures. Examples of solvents can include, but are not limited to benzene, toluene, xylene, aromatic 100, aromatic 150, acetone, methylethyl ketone, methyl amyl ketone, butyl acetate, t-butyl acetate, tetrahydrofuran, diethyl ether, ethylethoxy propionate, isopropanol, butanol, butoxyethanol, and so on.

Example 1—Reactivity of Natural Acids with ESS 1.1 Materials and Methods:

Epoxidized sucrose soyate (ESS) was prepared as previously reported;[17a,41] the epoxide equivalent weight is 246. Citric acid, DL-malic acid, L-tartaric acid, malonic acid, oxalic acid, and glutaric acid were purchased from Sigma-Aldrich. All the chemicals from Sigma-Aldrich were used as received. The structures and acidity of the acids are depicted and included in FIG. 1.

The following methods are used in the examples for the characterization of the compounds synthesized and materials prepared.

Infrared Spectra: The infrared spectra (FT-IR) were recorded with a Nicolet 6700 FT-IR (Thermoscientific, America).

Thermogravimetric Analysis: Thermogravimetric analysis (TGA) was carried using a TA Instruments Q500 TGA. In one type of experiment, the weight change occurring during the curing process was investigated. About 18 mg sample (pre-reacted at 80° C. for 1 h) was placed in the pan and heated at a rate of 50.00° C./min from 25° C. to 70.00° C., equilibrated to 80° C., and held isothermally at 80° C. for 3 h; then heated at a rate of 50.00° C./min to 120.00° C., and held isothermally at 120° C. for 1 h; finally, heated at a rate of 50.00° C./min to 150.00° C., and held isothermally at 150° C. for 2 h. The non-isothermal degradation was also investigated by TGA at a heating rate of 20° C./min from 25° C. to 700° C. under air and nitrogen atmospheres. In addition, the isothermal degradation of the cured E-C1 system was examined using TGA at 200° C. for 2 h and 250° C. for 2 h, respectively.

Dynamic Mechanical Analysis: Dynamic mechanical analysis (DMA) was carried out on a TA Instruments Q800 DMA in tension mode to measure the dynamic mechanical properties of the thermoset films. Rectangular samples with dimensions of 15 mm (length)×5 mm (width)×0.09-0.13 mm (thickness) were prepared and tested from −80° C. to 180° C. at a heating rate of 5° C. min$^{-1}$ and a frequency of 1 Hz.

Gel Content: The gel content of the films were measured using acetone extraction. The cured samples (free films with the thickness of 0.09-0.13 mm) weighing between 0.25 and 0.40 g were precisely weighed (W1), extracted with acetone for 72 h under reflux using a Soxhlet extractor, and finally dried and weighed (W2). The gel content was calculated as W2/W1.

Coating Thickness: The thickness of the cured coatings on smooth finish steel substrate was the average of 10 measurements taken using a Byko-Test 8500 coating thickness gauge at different locations on the film, and the uncertainty is the standard deviation.

Hardness: Pencil hardness, Konig pendulum hardness, and reverse impact resistance were measured according to ASTM D 3363, ASTM D 4366, and ASTM D 2794, respectively.

Adhesion: The adhesion of the coatings was evaluated using the ASTM D 3359 crosshatch adhesion method.

Double Rub Test: Methyl ethyl ketone (MEK) double rub test was carried out following ASTM D 5402 modified by using cheesecloth wrapped around a hammerhead.

Chemical degradation: The free films were immersed in 0.1, 1.0, or 10 M NaOH aqueous solutions at 90° C. The free films were also degraded in 1 M NaOH aqueous solution at RT. The degradation times were recorded. The degradation times in 0.1 M and 1 M NaOH aqueous solutions are the times for the samples to be completely dissolved or dispersed in the solutions (transparent solutions or emulsions without obvious particles or small pieces). However, the degradation times in 10 M NaOH aqueous solution are the times for the samples observed to be breaking into small pieces.

Water Contact Angles: The water contact angles were measured on a First Ten Angstroms FTA125 video-based contact angle and surface tension analyzer.

Gel Permeation Chromatography: Gel permeation chromatography was conducted on a TOSOH EcoSEC HLC-8320GPC with TSKgel® SuperH3000 column and a refractive index detector. Sample was diluted to 1 mg/mL in tetrahydrofuran for GPC runs. THF was used as the eluent at a flow rate of 0.35 mL/min.

Molecular Weight: Molecular weights were determined by using the aforementioned column and detector at 40° C. and polystyrene standards.

Gel Time and Reactivity of Natural Acids with ESS: Gel time was determined at 90° C. in a 20 ml jar with a magnetic stir bar. ESS, natural acids, and deionized $H_2O$ were stirred at 90° C.; the gel time was determined as the time for the stir bar to become immobile. In these experiments, the equivalent ratio of epoxy groups to carboxylic acid groups was 1:1. For the different acids, their solubility in water is different. So the molar ratio of $H_2O$/—COOH could not be fixed at the same value for all the natural acids/ESS systems. For tartaric acid and oxalic acid systems, their $H_2O$ molar ratio to —COOH are 1.5:1 and 4:1, respectively. For malic acid system, its —COOH molar ratio to $H_2O$ are 1:1. And in order to investigate the effects of $H_2O$ content on the curing reactivity, two molar ratios of $H_2O$/—COOH (1:1 and 2:1) were investigated for malonic acid and glutaric acid systems, and a series of molar ratios of $H_2O$/—COOH (0.2:1, 0.5:1, 1:1, 1.5:1, 2:1, 4:1) were examined for the citric acid system.

1.2 Preparation of Natural Acids Crosslinked ESS Networks

The feed compositions, pre-reaction, and curing conditions for the natural acid crosslinked ESS networks are shown in Table 1. For all the curing systems, the acids were dissolved in deionized water at 80° C. before mixing with ESS. Due to the low miscibility between the acids and ESS, the acids would separate out from the curing systems and could not react with ESS if the water evaporated. So the systems were pre-reacted in a closed container at 80, 70, or 90° C. for a period of time. Then they were coated on cleaned smooth finish steel panels (QD panels from Q-panel) and cleaned glass panels with a draw-down bar with gaps of 3 mils and 8 mils, respectively. Finally, they were cured at 80, 70, or 90° C. for 3 or 4 h, 120° C. for 1 h, and 150° C. for 2 h. The cured thermosets with thickness of 36-56 μm on the steel panels were used for coating properties determination. And the films with thickness of 100-120 μm were carefully removed from the glass panels and used to examine the thermal, mechanical, and degradation properties.

TABLE 1

The Feed Compositions, Pre-Reaction, and Curing Conditions for the Natural Acids Crosslinked ESS Networks

| Sample* | Acid | Epoxy/acid/$H_2O$ (Molar ratio) | Pre-reaction condition | Curing condition |
| --- | --- | --- | --- | --- |
| E-C1 | Citric acid | 1/1/1.5 | 80° C./1 h | 80° C./3 h, 120° C./1 h, 150° C./2 h |
| E-C0.8 | Citric acid | 1/0.8/1.2 | 80° C./1 h | 80° C./3 h, 120° C./1 h, 150° C./2 h |
| E-C0.65 | Citric acid | 1/0.65/0.975 | 80° C./1 h | 80° C./3 h, 120° C./1 h, 150° C./2 h |
| E-C0.5 | Citric acid | 1/0.5/0.75 | 80° C./1 h | 80° C./3 h, 120° C./1 h, 150° C./2 h |
| E-C0.35 | Citric acid | 1/0.35/0.525 | 80° C./30 min | 80° C./3 h, 120° C./1 h, 150° C./2 h |
| E-C0.2 | Citric acid | 1/0.2/0.3 | 80° C./30 min | 80° C./3 h, 120° C./1 h, 150° C./2 h |
| E-M | Malic acid | 1/1/1.5 | 80° C./100 min | 80° C./3 h, 120° C./1 h, 150° C./2 h |
| E-T | Tartaric acid | 1/1/2.0 | 80° C./110 min | 80° C./3 h, 120° C./1 h, 150° C./2 h |
| E-ML | Malonic acid | 1/1/1.5 | 70° C./20 min | 70° C./3 h, 120° C./1 h, 150° C./2 h |
| E-G | Glutaric acid | 1/1/1 | 90° C./2 h | 90° C./4 h, 120° C./1 h, 150° C./2 h |

Figure 2:
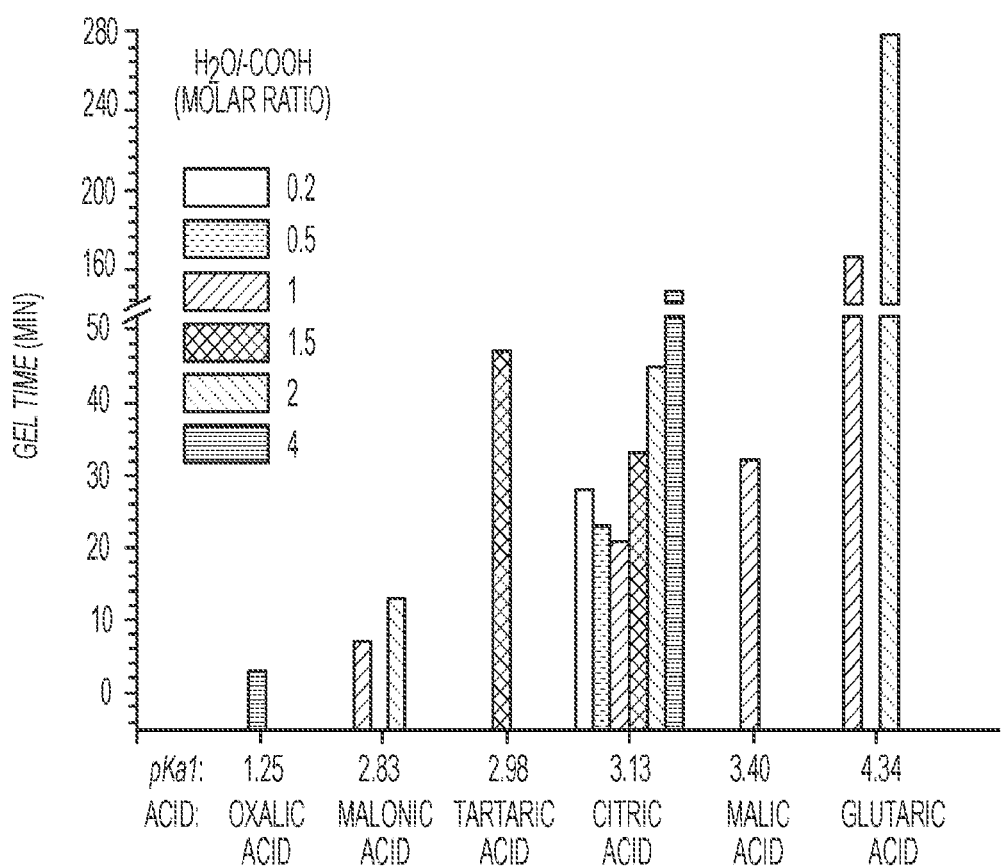
FIG. 2 depicts the gel time as a function of pKa1 of water-soluble water-soluble multifunctional carboxylic acids ($n_{COOH}/n_{epoxy\ group}$=1:1)

*E = ESS; C = critic acid; M = malic acid; T = tartaric acid; ML = malonic acid; G = glutaric acid 1.3 Results and Discussion Reactivity of Natural Acids Toward ESS During the Curing Reaction: The gel times of the ESS/natural acid systems were investigated to understand the reactivity of the natural acids towards ESS during the curing process. The shorter the gel time, the higher the reactivity. Although the molar ratio of $H_2O$/—COOH could not be fixed at the same value for all the natural acid/ESS systems due to the different acids' solubility in water, the gel time of the samples could still be compared as shown in FIG. 2. In order to investigate the effects of $H_2O$ content on the curing reactivity, a series of molar ratios of $H_2O$/—COOH (0.2:1, 0.5:1, 1:1, 1.5:1, 2:1, 4:1) were examined for the citric acid system and two molar ratios of $H_2O$/—COOH (1:1 and 2:1) were evaluated for the malonic acid and glutaric acid systems. For the citric acid systems, with lower content of water (with 0.2:1, 0.5:1 molar ratios of $H_2O$/—COOH), citric acid could not be completely dissolved in water at 90° C., so with the increase of water content, the gel time was decreased. When the water content increased to 1:1 molar ratio of $H_2O$/—COOH, citric acid could be fully dissolved in water, and it showed the shortest gel time for the citric acid systems. Upon further increasing the water content, the gel time increased. For the malonic acid and glutaric acid systems, the systems with the 2:1 molar ratio of $H_2O$/—COOH exhibited a longer gel time than the systems with the 1:1 molar ratio of $H_2O$/—COOH. So it could be indicated that with the increase of water content, the reactivity of the natural acids towards the epoxy groups increased and after the water could completely dissolve the natural acids, further increasing the water content would decrease the reactivity. This observation can be explained by two facts. On the one hand, the solid natural acids are not able to cure ESS due to their non-miscibility with ESS. With the lower water content, only that portion of the natural acids that are dissolved in water could react with the epoxy groups in ESS, so as the water content is increased, a greater amount of natural acids is dissolved in the water and able to react with ESS, so the gel time is shortened. On the other hand, ESS has poor miscibility with water. With a low content of water, the acid-water mixture may be dispersed in the ESS, but when the water content is high, water would phase separate from ESS. So upon further increasing the water content to the point where the natural acids could be completely dissolved in water, the natural acids would also separate out with water, corresponding to the decreased reactivity.

From FIG. 2, it can also be seen that with the same water content, the systems with the natural acids having a higher pKa1 have a longer gel time. For the citric acid system with the 4:1 molar ratio of $H_2O$/—COOH, the gel time was 134 min, but for the oxalic acid system with the same molar ratio of $H_2O$/—COOH, the gel time was 3 min. And for the malonic acid, citric acid, malic acid, and glutaric acid systems with a 1:1 molar ratio of $H_2O$/—COOH, the gel time follows the order: malonic acid>citric acid>malic acid>glutaric acid. In addition, for the malonic acid, citric acid, and glutaric acid systems with a 2:1 molar ratio of $H_2O$/—COOH, the gel time also follows the order: malonic acid>citric acid>glutaric acid. These results show that the higher the acidity of the natural acid, the higher its reactivity toward ESS. However, for tartaric acid, it has a lower pKa1 than citric acid, but its system had a longer gel time than the citric acid system. This might be due to the phenomenon that the tartaric acid has a lower solubility in water than citric acid. Even when dissolved in water, it would easily separate out during the curing process and thus its ability to react with ESS is limited.

Figure 3:
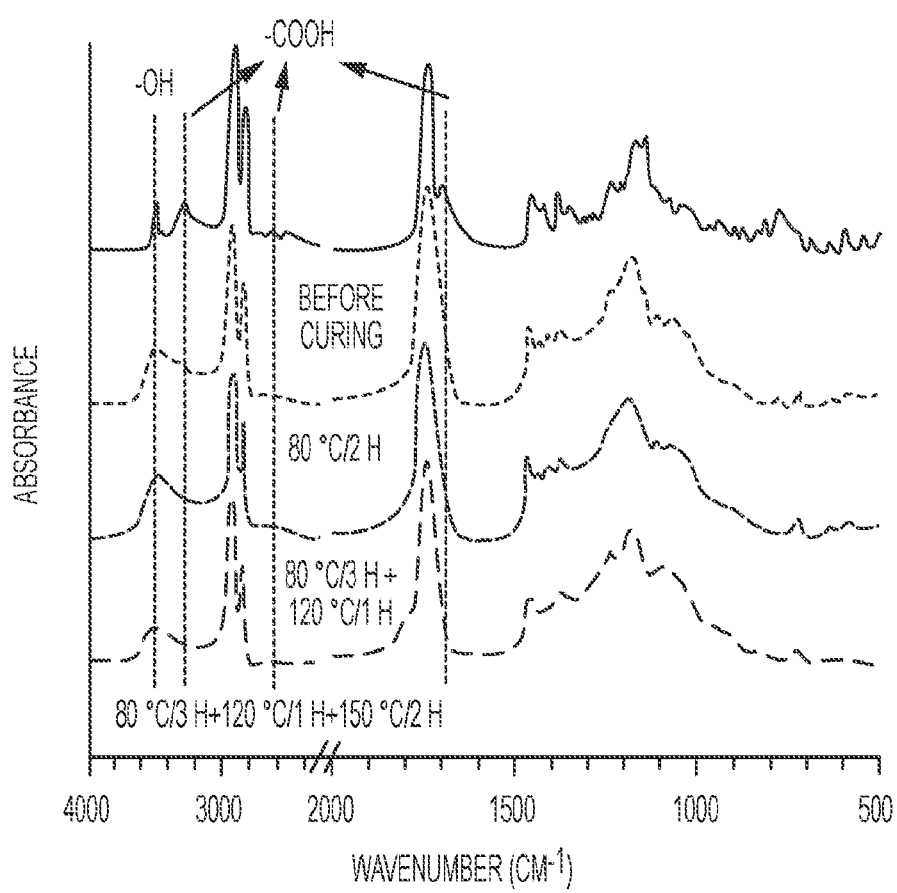
FIG. 3 depicts the FTIR spectra of E-C1 before and after curing at different curing conditions (80° C./2 h, 80° C./3 h+120° C./1 h, 80° C./3 h+120° C./1 h+150° C./2 h).
Figure 4:
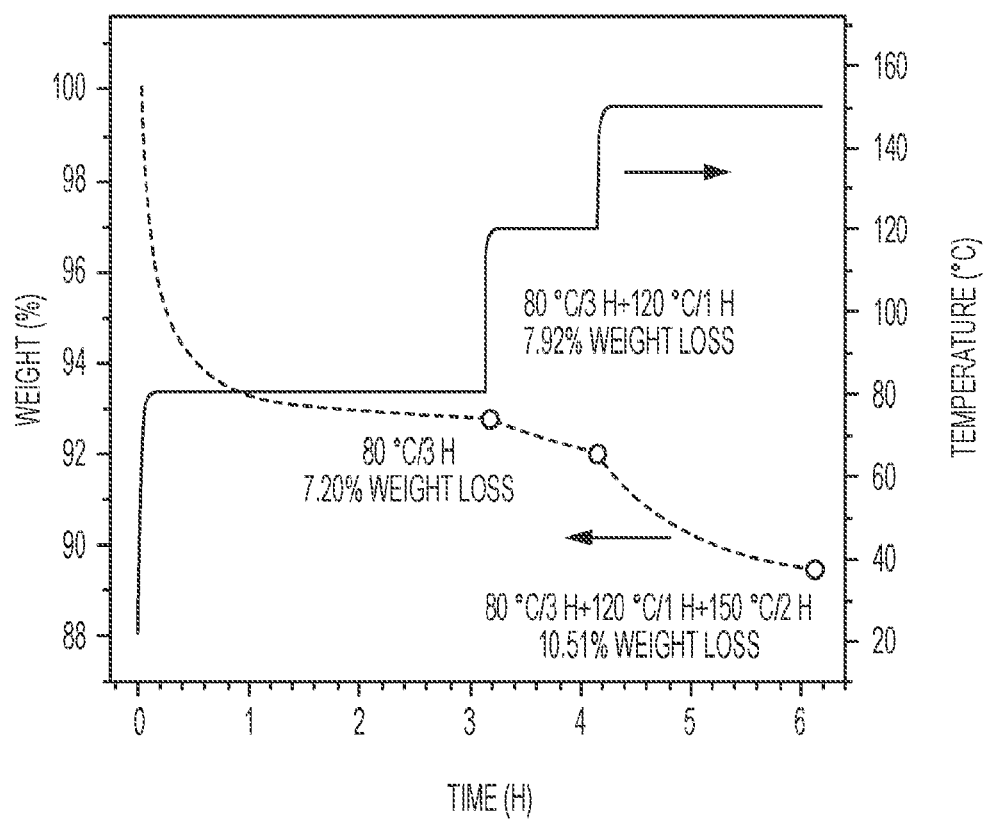
FIG. 4 depicts the weight change during the curing process for E-C1 (the original wt. % $H_2O$ is 8.00%).

Curing Process: The curing process of E-C1 was investigated by FTIR and TGA. From the FTIR spectra (FIG. 3), it can be seen that after curing at 80° C. for 2 h, the peaks at 3290 cm$^{-1}$ and 1705 cm$^{-1}$ for carboxyl groups decreased and the peak around 3500 cm$^{-1}$ for hydroxyl groups increased. This is due to the ring opening reaction between epoxy groups from ESS and carboxyl groups from citric acid which consumes carboxyl groups and forms hydroxyl groups. After curing at 80° C. for 3 h and 120° C. for 1 h, the peak for hydroxyl groups increased and the peak at 3290 cm$^{-1}$ for carboxyl groups decreased further. After further curing at 150° C. for 2 h, almost all the carboxyl groups were exhausted and there appeared a shoulder peak around 1800 cm$^{-1}$ which was assigned to the characteristic stretch vibration of anhydride group and the peak for hydroxyl groups around 3500 cm$^{-1}$ reduced. These results are indicative of the occurrence of anhydride formation and esterification between unreacted carboxyl groups and hydroxyl groups. TGA was used to monitor the weight change occurring during the curing process. As shown in FIG. 4, after curing at 80° C. for 3 h, the weight loss was 7.2%; this weight loss is due to the evaporation of water from the system. The original water content is 8 wt. %, so 90% added water was evaporated as the first step of the curing process. After further curing at 120° C. for 1 h, the weight loss reached 7.92%; almost all of the water had evaporated after this step of the curing process. And after further curing at 150° C. for 2 h, a total of 10.51% weight loss was observed. This weight loss is higher than the original water content. It is believed that this excess weight loss during the third step of the curing process of 150° C./2 h is a result of the water produced during the formation of anhydride groups and from esterification from carboxylic acid groups reacting with hydroxyl groups in the system, consistent with the observations in the FTIR determination.

Curing Mechanism between the Natural Acids and ESS: As shown in Scheme 1, the main curing reaction is the acid-catalyzed ring-opening reaction between the carboxylic acid groups and epoxides. $H_2O$ plays two roles in this reaction: 1) it dissolves the natural acids and makes them disperse well in ESS; and 2) it is able to produce $H^+$ which catalyzes the ring-opening reaction between the carboxylic acid groups and epoxides. The $H^+$ in the water protonates the oxygen atom of the epoxy groups and activates the epoxy groups.[29] Then the carboxylate ion (—COO$^-$) is able to attack and open the activated epoxy groups and produce ester linkages. As long as two of the carboxylic acids react with the epoxy groups, ESS will be crosslinked. Although $H_2O$ has poor nucleophilic ability, the hydrolysis of epoxy groups may slowly occur due to the high reactivity of the protonated epoxides.[30] As indicated above, other reactions such as the esterification of the carboxyl groups with hydroxyl groups and the formation of anhydride between two carboxyl groups also occurred in the systems.

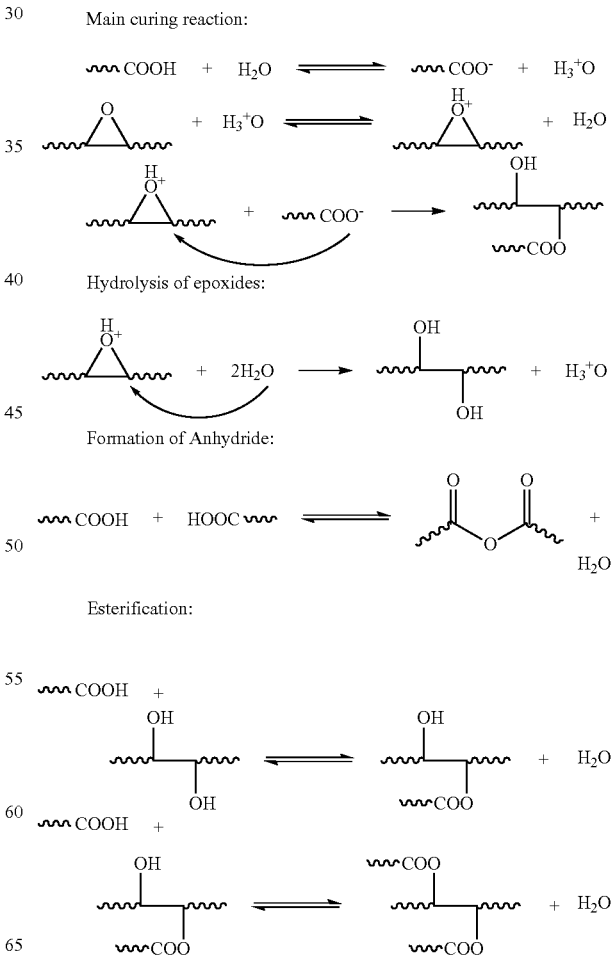

Scheme 1. The Curing Mechanism Between the Natural Acids and ESS

Figure 5:
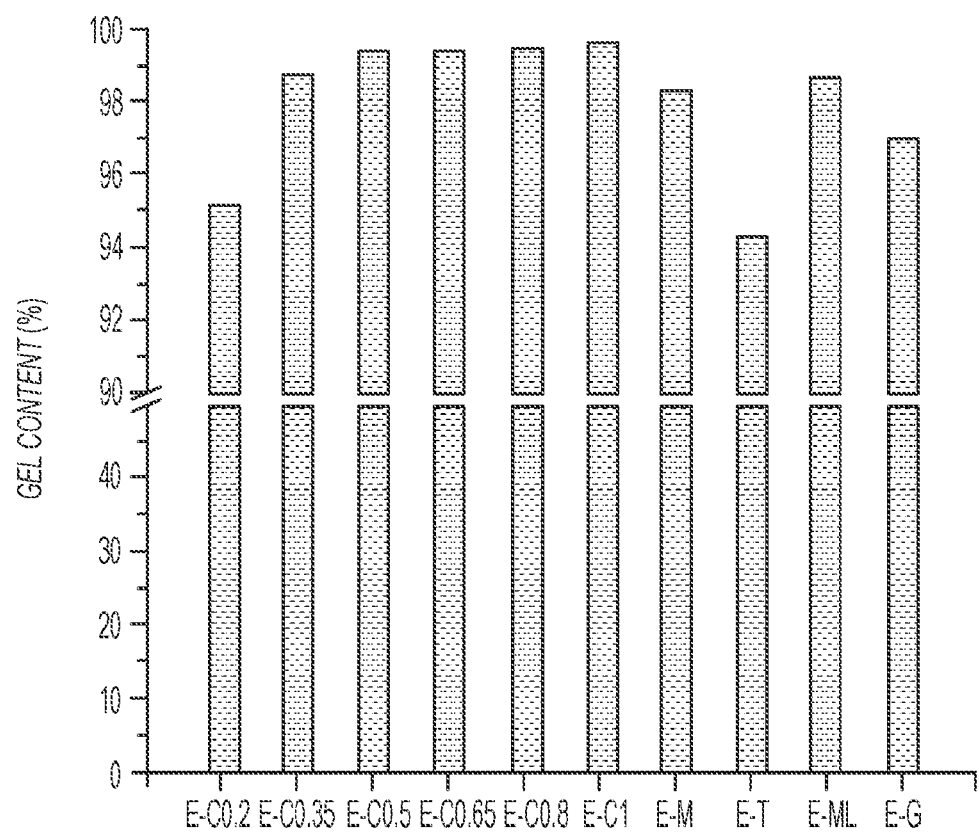
FIG. 5 depicts the gel content of the water-soluble multifunctional carboxylic acids crosslinked ESS networks.

Gel Content of Natural Acids Crosslinked ESS Networks: Gel content is a crucial factor for the performance of thermosetting materials and has a direct relationship with their properties. Thus, the gel content of the thermosets was determined and shown in FIG. 5. It is clear that all the natural acid crosslinked ESS systems showed high gel content of 94.4%-99.7%, which indicates that ESS is well-cured by the natural acids with water assistance. For the citric acid systems, the gel content increased with the citric acid content. When the molar ratio of carboxylic acid groups to epoxy groups was above 0.5:1, the obtained epoxy networks showed gel contents around 99.5%. For the malic acid system (E-M), malonic acid system (E-ML), and glutaric acid system (E-G), they presented relatively lower gel contents of 98.4%, 98.7%, and 97.2%, respectively. The tartaric acid system (E-T) exhibited the lowest gel content of 94.4%. This can be explained from the observation that tartaric acid separated out during the curing process which is also confirmed by the opaque appearance of the E-T coating. The phase separated tartaric acid cannot react with ESS, and then it can be dissolved in acetone during the Soxhlet extraction, resulting in the relatively lower gel content than the other materials.

Figure 6:
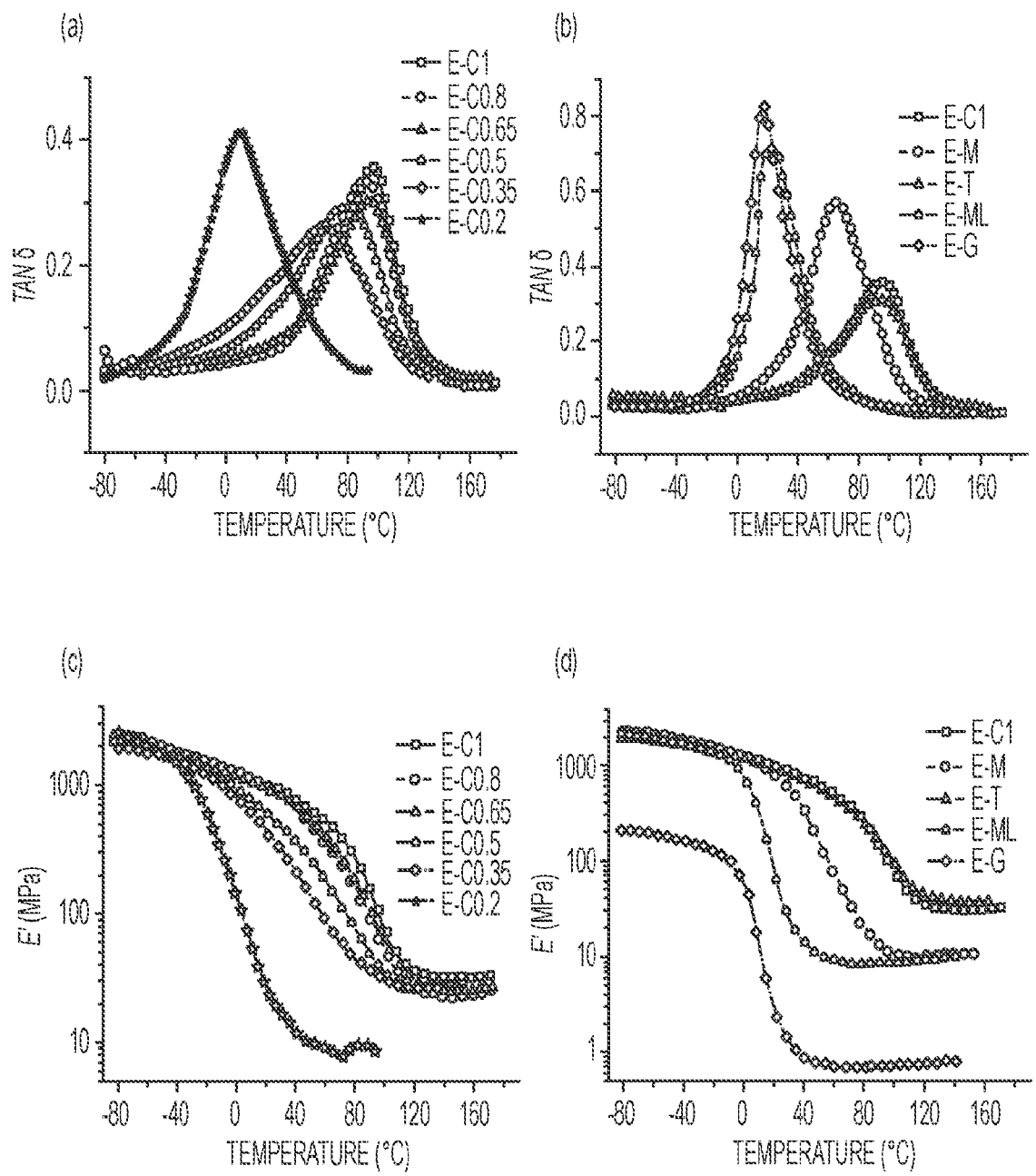
FIG. 6(a) depicts the Tan δ DMA curves of the water-soluble multifunctional carboxylic acid crosslinked ESS networks.
FIG. 6(b) depicts the Tan δ DMA curves of the water-soluble multifunctional carboxylic acid crosslinked ESS networks.
FIG. 6(c) depicts the Storage Modulus, E', curves of the water-soluble multifunctional carboxylic acid crosslinked ESS networks.
FIG. 6(d) depicts Storage Modulus, E', curves of the water-soluble multifunctional carboxylic acid crosslinked ESS networks.

Thermal and Mechanical Properties of the Natural Acids Crosslinked ESS Networks: DMA was used to determine the glass transition temperature ($T_g$), modulus, and crosslink density of the cured samples. The curves of tan δ and storage modulus of the cured samples as a function of temperature are shown in FIG. 6. FIGS. 6(a) and 6(b) show the curves of tan δ and FIGS. 6(c) and 6(d) show the curves of storage modulus. The peaks of the tan δ curves were used to determine the $T_g$ of the cured samples. As shown in Table 2, the citric acid crosslinked samples show increasing $T_g$ and modulus values at 25° C. with increasing citric acid content from 9° C. and 20.0 MPa for E-C0.2 to 96° C. and 944 MPa for E-C1. This is due to the rigid structure of the citric acid. The malonic acid and glutaric acid crosslinked samples presented low $T_g$ values of 23° C. and 17° C. and modulus at 25° C. of 39.6 MPa and 1.82 MPa, respectively. This might be due to their better flexibility and lower functionalities than citric acid. Although malic acid and tartaric acid are also dicarboxylic acids, they possess hydroxyl groups in the structures, which could increase the hydrogen bonding of the crosslinked samples. Thus, the malic acid and tartaric acid crosslinked samples showed relatively higher $T_g$ and modulus values at 25° C. The modulus values at $T_g$+60° C. were utilized to calculate the crosslinking density of the cured samples according to the following equation:[31]

$$v_e = \frac{E'}{3RT}$$

where E' is the storage modulus of the thermoset in the rubbery plateau region, R is the gas constant, and T is the absolute temperature. For the citric acid series of thermosets, with the increase of citric acid content, the modulus at $T_g$+60° C. and crosslink density of the samples is expected to increase, while the results observed appear to be counterintuitive. Earlier studies appeared to show that intramolecular-ESS crosslinking can occur with short-chain dicarboxylic acid crosslinkers.[32] Here, the intra-ESS crosslinking might also be occurring. When the citric acid content is increased, the chance of intra-ESS crosslinking may increase, which would decrease the crosslinking between different ESS molecules. As a result, the overall crosslink density decreased with increasing citric acid content from 2725 mol/m³ for E-C0.35 to 2288 mol/m³ for E-C0.8. While further increasing the citric acid content might lead to the increased chance of crosslinking between different ESS molecules, consequently the E-C1 showed increased crosslinking density of 2997 mol/m³. The E-M, E-ML, and E-G exhibited lower crosslink density than E-C1, which is consistent with their lower gel content relative to E-C1; this is due to the lower functionalities of malic acid, malonic acid, and glutaric acid. But the E-T showed high crosslinking density, even higher than E-C1; this might be due to the reason that tartaric acid could not be easily dispersed in ESS, so the chance of intra-ESS crosslinking might be lower than the other acid systems and the reacted tartaric acid mainly crosslinked the different ESS molecules. However, it should be pointed out that experimentally determining the amount of intramolecular versus intermolecular reactions is extremely challenging.

TABLE 2

Gel Content and DMA Data of the Natural Acid Crosslinked ESS Networks

| Samples | $T_g$ (° C.) | Modulus at 25° C. (MPa) | Modulus at $T_g$ + 60° C. (MPa) | Crosslinking density (mol/m³) |
| --- | --- | --- | --- | --- |
| E-C1 | 96 | 944 | 32.0 | 2997 |
| E-C0.8 | 91 | 908 | 24.2 | 2288 |
| E-C0.65 | 93 | 865 | 25.9 | 2439 |
| E-C0.5 | 79 | 532 | 27.5 | 2677 |
| E-C0.35 | 63 | 358 | 26.9 | 2725 |
| E-C0.2 | 9 | 20.0 | 7.39 | 865 |
| E-M | 66 | 696 | 10.1 | 1016 |
| E-T | 95 | 874 | 36.5 | 3415 |
| E-ML | 23 | 39.6 | 8.60 | 969 |
| E-G | 17 | 1.82 | 0.705 | 81 |

Coating Properties of the Natural Acid Crosslinked ESS Networks: The coating properties of the thermosets including Konig pendulum hardness, pencil hardness, solvent resistance, and adhesion and impact strength were investigated and the data are shown in Table 3. Both Konig pendulum hardness and pencil hardness of the citric acid systems increased with the content of citric acid, from 21 seconds Konig pendulum hardness and 3B pencil hardness for E-C2 to 132 seconds Konig pendulum hardness and 3H pencil hardness for E-C1. E-M and E-T also exhibited relatively high hardness of 91 seconds and 2H, and 141 seconds and 3H, respectively. And E-ML and E-G seem to be soft with hardness of 45 seconds and F, and 73 seconds and H, respectively. This is due to the reason that, with the introduction of citric acid, the crosslink density and rigidity of the samples increased, resulting in increased hardness. And for malic acid and tartaric acid, they are also rigid, corresponding to the high hardness of E-M and E-T. While for malonic acid and glutaric acid, they are not as rigid as citric acid, malic acid, and tartaric acid, which can also be seen from the low modulus of E-ML and E-G. But the samples with high hardness exhibited relatively lower crosshatch adhesion and impact strength, and the samples with relatively lower hardness such as E-C0.2, E-ML, and E-G showed high adhesion and impact strength. And all the samples showed excellent solvent resistance with MEK double rubs above 400, which also demonstrated that they were well-crosslinked, in agreement with the high gel content of the samples.

TABLE 3

Coatings Properties of the Natural Acid Crosslinked ESS

| Sample | Thickness (μm) | König Pendulum Hardness (sec) | Pencil hardness | MEK double rubs | Cross-hatch adhesion | Reverse Impact (in · lb) |
|---|---|---|---|---|---|---|
| E-C1 | 43 | 132 | 3H | >400 | 3B | 8 |
| E-C0.8 | 35 | 133 | 3H | >400 | 3B | 6 |
| E-C0.65 | 41 | 115 | 2H | >400 | 3B | 8 |
| E-C0.5 | 56 | 108 | 2H | >400 | 4B | 18 |
| E-C0.35 | 36 | 54 | F | >400 | 4B | 40 |
| E-C0.2 | 45 | 21 | 3B | >400 | 5B | 141 |
| E-M | 38 | 91 | 2H | >400 | 5B | 8 |
| E-T | 45 | 141 | 3H | >400 | 2B | 8 |
| E-ML | 42 | 45 | F | >400 | 5B | 145 |
| E-G | 33 | 73 | H | >400 | 5B | >168 |

Figure 7:
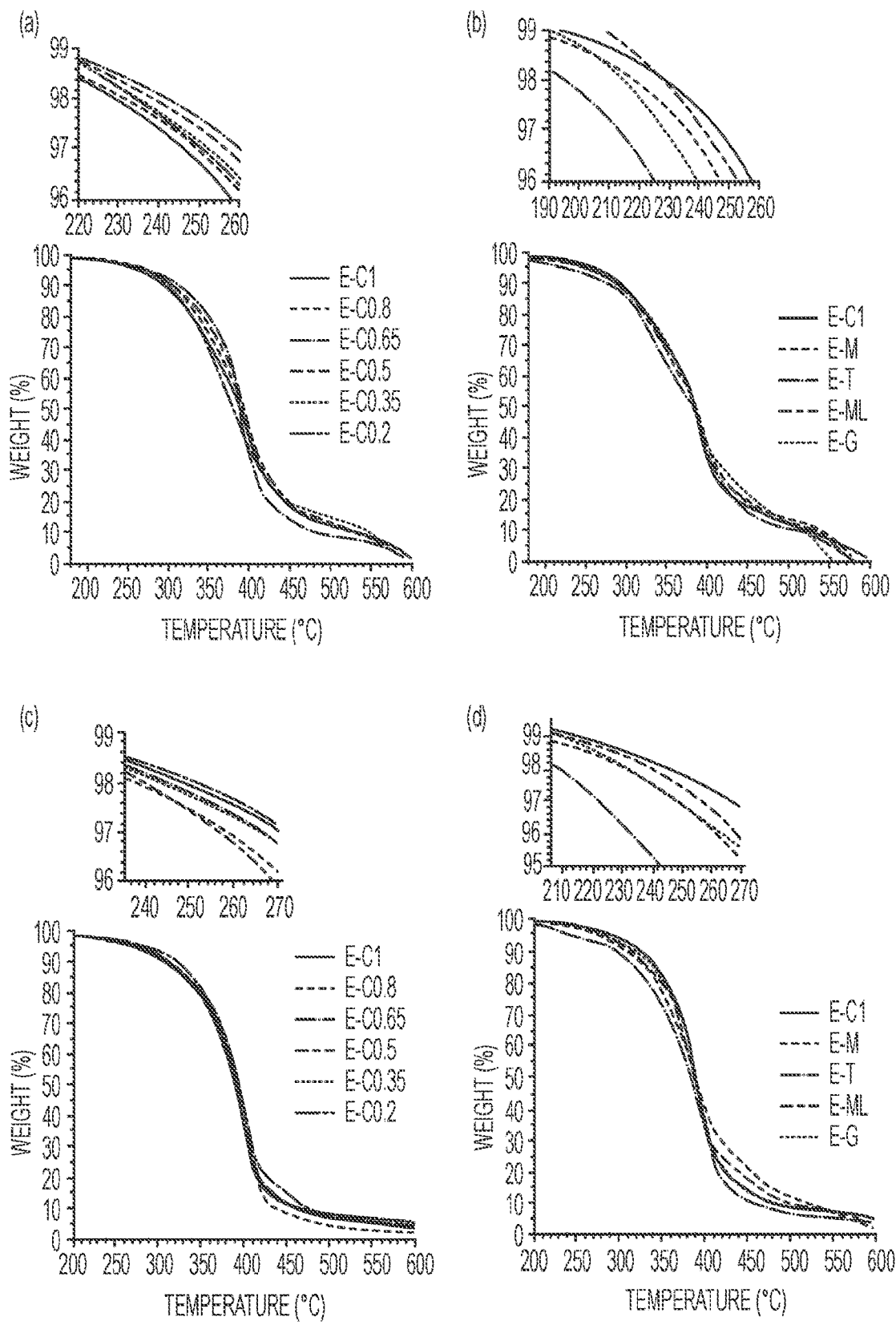
FIG. 7(a) depicts the TGA curves of the water-soluble multifunctional carboxylic acids crosslinked ESS networks in air.
FIG. 7(b) depicts the TGA curves of the water-soluble multifunctional carboxylic acids crosslinked ESS networks in air.
FIG. 7(c) depicts the TGA curves of the water-soluble multifunctional carboxylic acids crosslinked ESS networks in nitrogen.
FIG. 7(d) depicts the TGA curves of the water-soluble multifunctional carboxylic acids crosslinked ESS networks in nitrogen.
Figure 8:
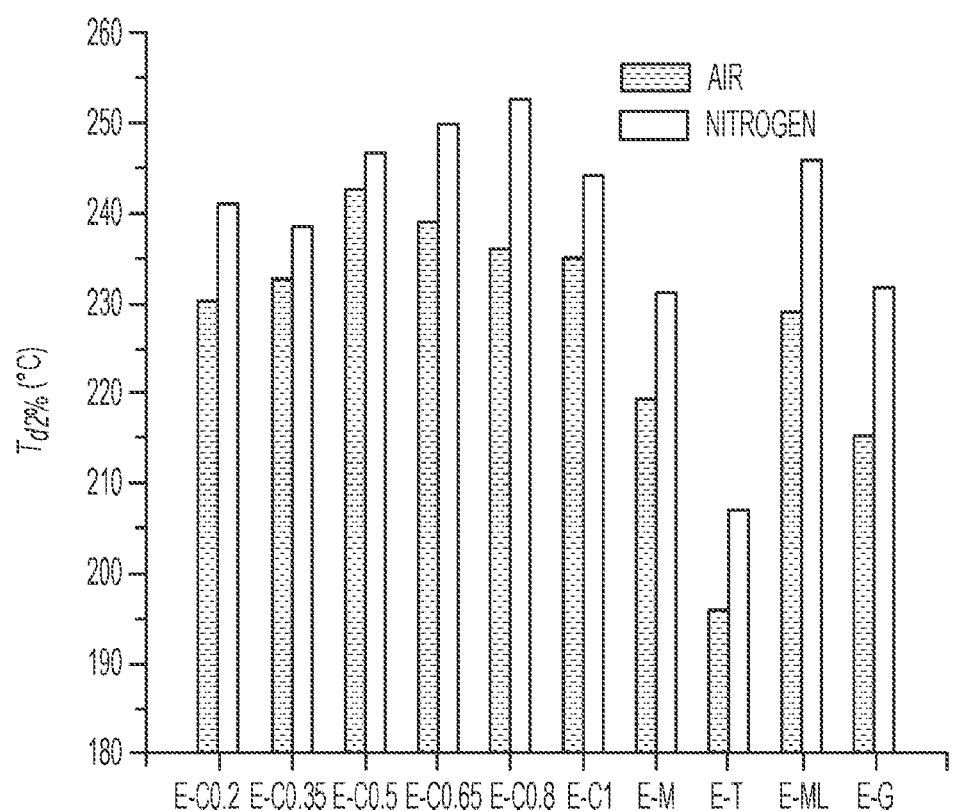
FIG. 8 depicts the $T_{d2\%}$ of the water-soluble multifunctional carboxylic acid crosslinked ESS networks.

Thermal Degradation of the Natural Acid Crosslinked ESS Networks: TGA was used to investigate the thermal degradation of the cured thermoset samples. FIG. 7 shows the non-isothermal degradation curves of all the samples under nitrogen and air atmospheres, and the initial degradation temperatures (the temperature for 2% weight loss, $T_{d2\%}$) are summarized in FIG. 8. $T_{d2\%}$ of the natural acid crosslinked ESS networks in air were low from 196.3° C. for E-T to 242.7° C. for E-00.65. Under nitrogen atmosphere, the $T_{d2\%}$ values were a little higher than those under air atmosphere, from 207.4° C. for E-T to 252.9° C. for E-C0.35, but they are still much lower in comparison to the commonly used bisphenol A epoxy systems.[33] Ober and coworkers[34] reported that thermosets with secondary or tertiary ester linkages are more easily decomposed with thermal treatment than thermosets with primary ester linkages. Morell et al.[34] used secondary ester linkages in hyperbranched poly (ester-amide); and polyaminoesters as cleavable modifiers to improve the properties of the commonly used epoxy resins diglycidyl ether of bisphenol A (DGEBA). Due to easy degradation of the secondary ester linkages, the modified DGEBA networks showed better thermal degradability than the neat DGEBA system. And Ma et al.[3a] also reported that with the introduction of secondary ester linkages from acrylated epoxidized soybean oil (AESO), cured itaconic acid based epoxy resins exhibited decreased thermal degradation temperature. Thus, the low thermal degradation temperature of the natural acid crosslinked ESS systems of the invention is believed to be due to the high content of secondary ester linkages produced by the ring opening reaction between epoxy groups from ESS and carboxylic acid groups from the natural acids. It has also been reported that the optimal temperature for safe rework operations of thermosets is 200-250° C.[34,36]; accordingly, the natural acid crosslinked ESS thermosets of the invention may be used as reworkable thermosetting resins.

Figure 9:
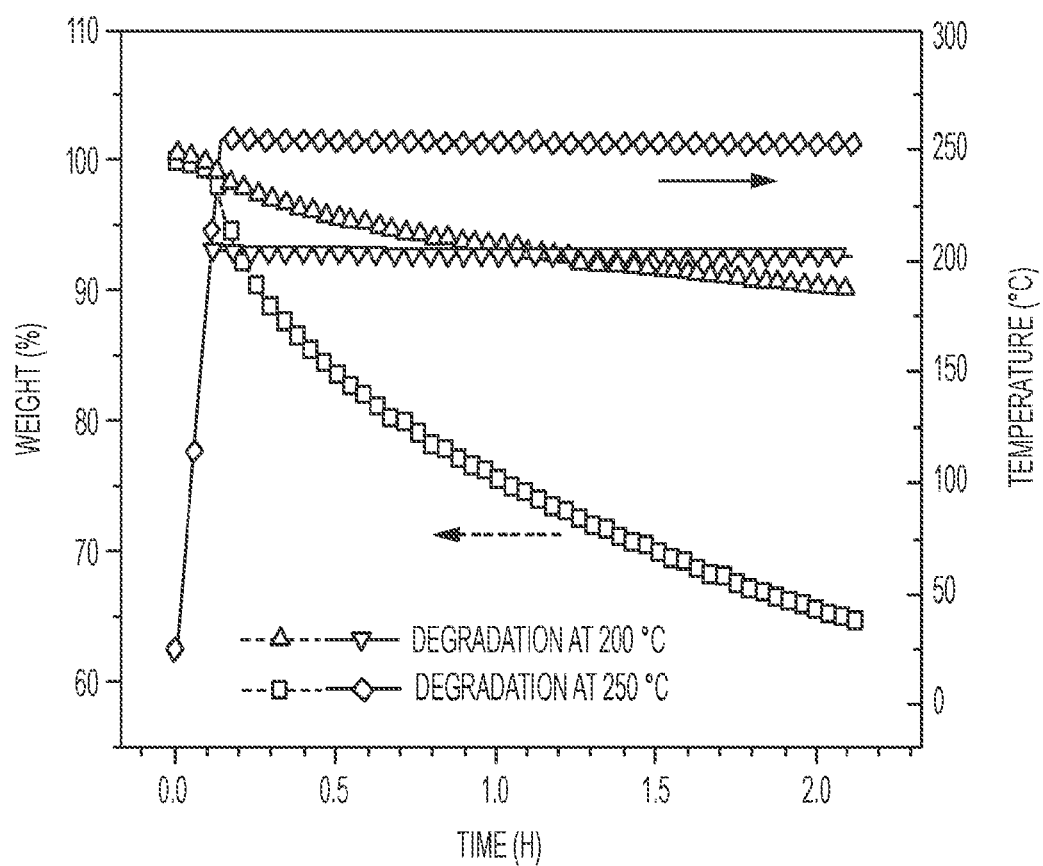
FIG. 9 depicts the weight loss of the cured E-C1 during the isothermal degradation process at 200° C. and 250° C.
Figure 10:
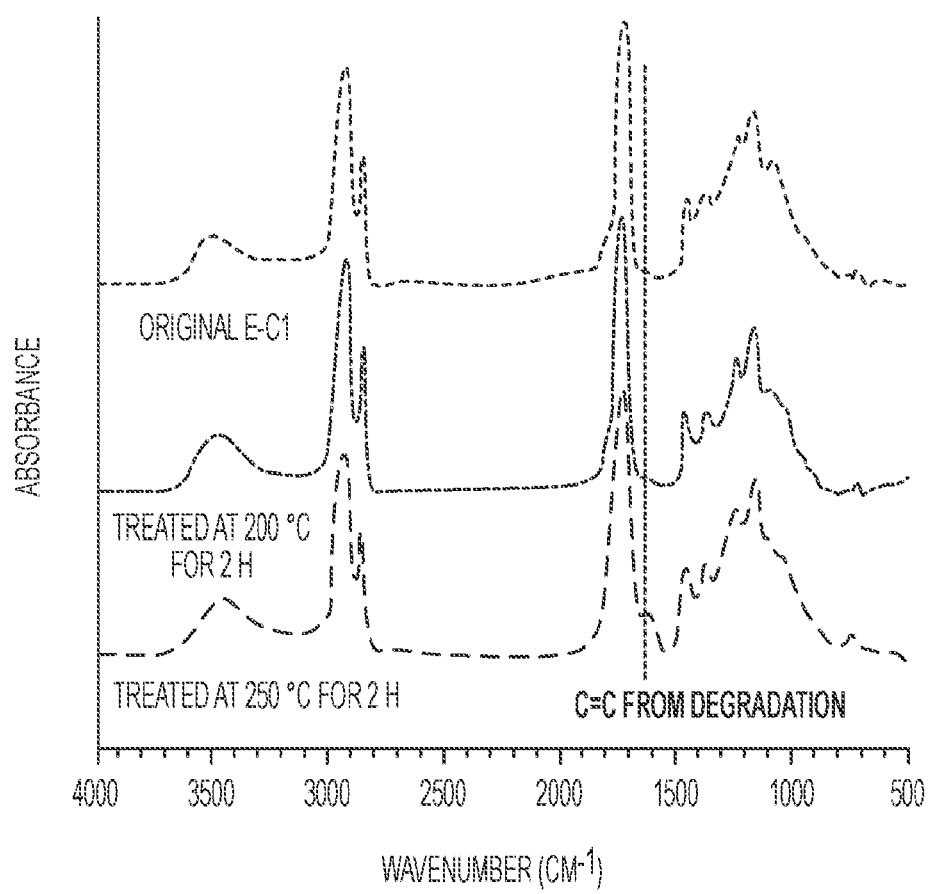
FIG. 10 depicts the FTIR spectra of E-C1 before and after thermal treatment at 200° C. for 2 h or 250° C. for 2 h.

The isothermal degradation was also examined for E-C1. As shown in FIG. 9, 9.7% weight and 35.1% weight was lost after thermal treatment at 200° C. for 2 h and 250° C. for 2 h, respectively. And FTIR was used to monitor the chemical change during the thermal degradation. The FTIR spectra of E-C1 before and after thermal treatment at 200° C. for 2 h or 250° C. for 2 h are presented in FIG. 10. As can be seen, the peak at 1624 cm$^{-1}$ belonging to vinyl groups appeared after the thermal treatment. As the cleavage of tertiary ester linkages could produce vinyl groups and carboxyl groups during the thermal degradation,[37] these kinds of vinyl groups might result from the decomposition of secondary ester linkages.

Figure 11:
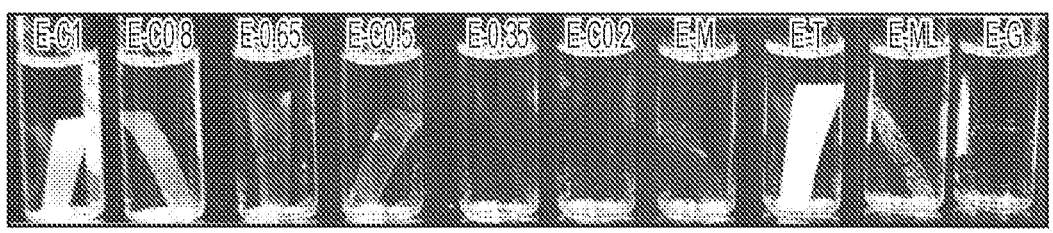
FIG. 11 depicts the degradation of the water-soluble multifunctional carboxylic acids crosslinked ESS networks at 90° C. in 1 M NaOH aqueous solution.
Figure 11:
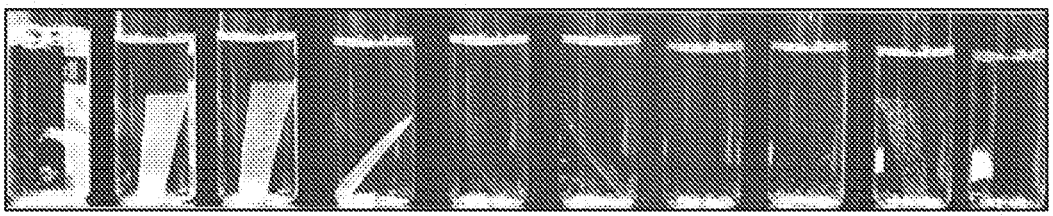
Figure 11:
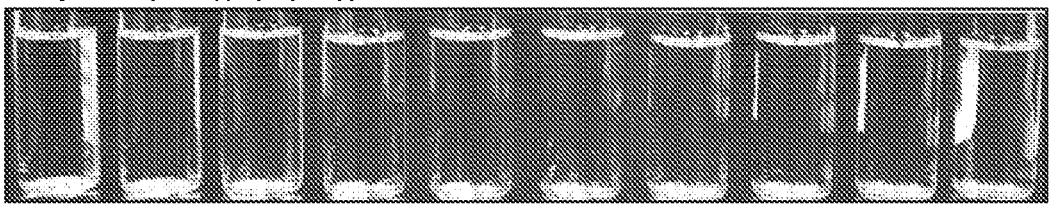
Figure 12:
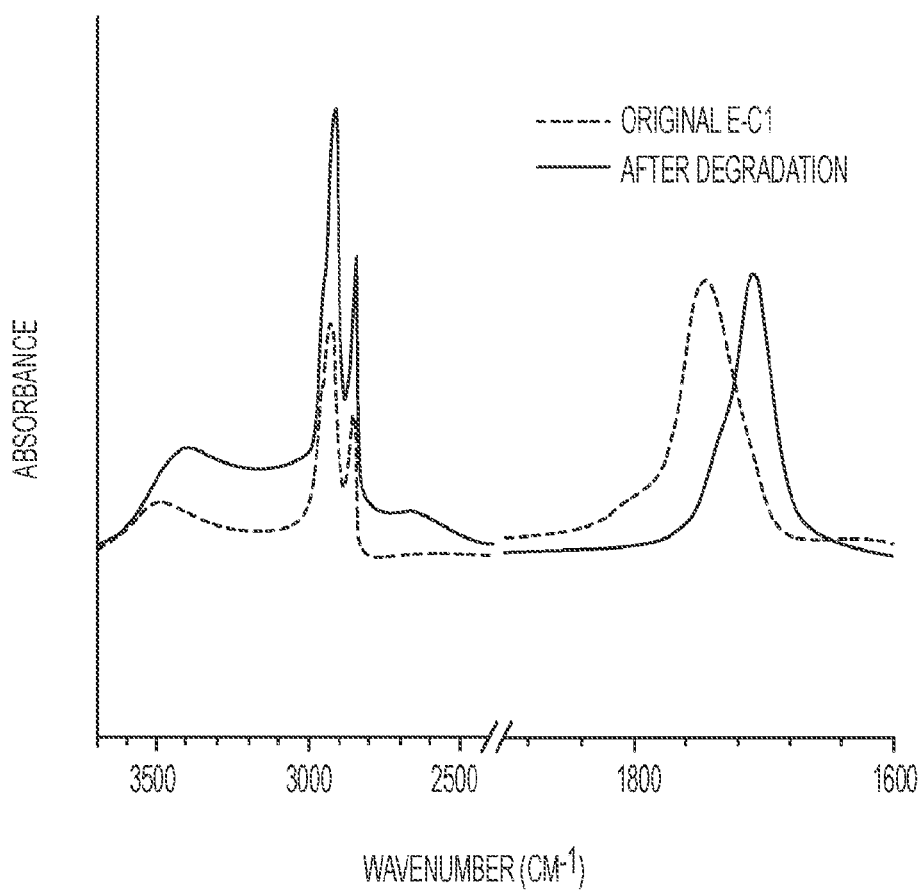
FIG. 12 depicts the FTIR spectra of original E-C1 and the extracted sample from the degraded E-C1 at 90° C. in 1 M NaOH aqueous solution.
Figure 13:
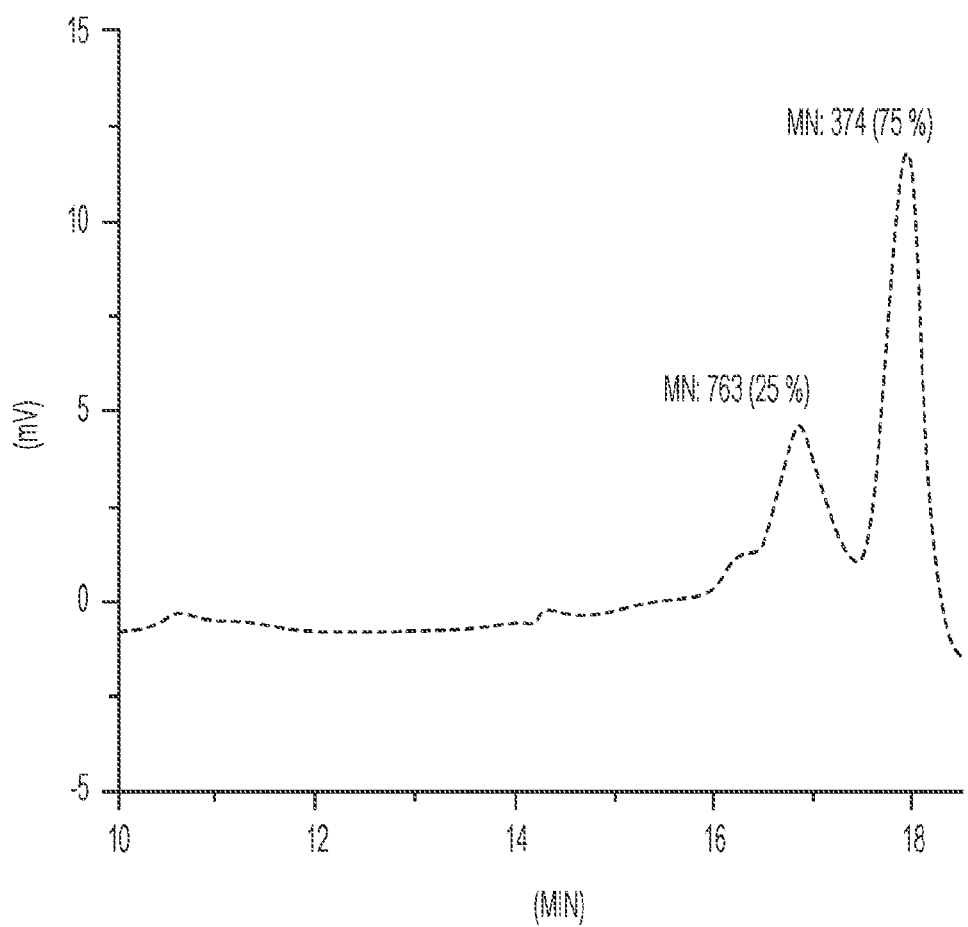
FIG. 13 depicts the GPC trace of the extracted sample from the degraded E-C1 at 90° C. in 1 M NaOH aqueous solution.

Chemical Degradation of the Natural Acid Crosslinked ESS Networks: Most reported degradable thermosets are not soluble in water after decomposition; accordingly organic solvents such as ethanol, methanol, and tetrahydrofuran are often used during the degradation process.[38] In order to make degraded thermosets soluble in water, hydrophilic groups such as esters or salts of p-styrenesulfonic acid have been introduced into the structure of the degradable thermosets.[39] In one embodiment of the invention, all of the samples could be quickly degraded and completely dissolved in basic water. As can be seen in Table 4, all the samples could be completely dissolved in 1 M NaOH aqueous solution after degradation at 90° C. for 13 min-235 min. FIG. 11 shows the appearance of the samples before and after degradation at 90° C. for 20 min and 235 min. After degradation at 90° C. for 20 min, E-G and E-M entirely dissolved in 1 M NaOH aqueous solution, E-C1 and E-T was decomposed into small pieces, and other samples kept their original shapes. After degrading at 90° C. for 235 min, all of the solid samples in 1 M NaOH aqueous solution disappeared. And in a low concentration NaOH aqueous solution (0.1 M), all the samples could also be degraded and completely dissolved within a relatively longer time from 87 min for E-G to 3 days for E-0.5, E-C0.35, E-C0.2, and E-ML. However, when using high concentration NaOH aqueous solution (10 M), all the samples could be degraded into small pieces in 45 min, but the small pieces could not completely dissolve even after prolonged degradation time of several days. This was because the high content of NaOH in the water decreased the solubility of the other compounds. And at room temperature, the samples could also be degraded but much more slowly than at 90° C. In order to investigate the reason for the outstanding degradability of the natural acid crosslinking ESS networks, the degraded E-C1 at 90° C. in 1 M NaOH aqueous solution was extracted with ethyl acetate after being neutralized with hydrochloric acid (36.5%-38.0%) and examined with FTIR and GPC, as shown in FIG. 12 and FIG. 13. From the FTIR spectra of the extracted sample (FIG. 12), it can be seen that the peak around 1745 cm$^{-1}$ belonging to the ester bonds tended to disappear, and a strong peak around 1710 cm$^{-1}$ ascribed to carboxylic acid groups appeared; and the peaks for CH and $CH_2$ became stronger than the peaks for carbonyl groups; the situation is the opposite for the original E-C1 thermoset. This indicated that most of the ester bonds were cleaved and produced carboxylic acid groups and the citric acid, which contains higher content of carbonyl groups than $CH_2$, was also produced from the degradation process but could not be extracted with ethyl acetate due to its excellent water solubility, corresponding to the enhanced CH and $CH_2$ peaks relative to carbonyl groups' peaks in the FTIR spectrum of the extracted sample. In the GPC spectrum (FIG. 13), there are two peaks representing compounds with molecular weights of 374 g/mol (75%) and 763 g/mol (25%), respectively. The compound with the molecular weight of 374 is believed to be multi-hydroxyl fatty acids and the compound with the molecular weight of 763 (25%) is believed to be multi-hydroxyl fatty acids esterified to a sucrose molecule with ester bonds which could be seen from the shoulder peak in the FTIR spectrum of the extracted sample (FIG. 12). Thus, it can be concluded that during the degradation process, the ester bonds connecting citric acid and ESS were hydrolyzed completely, and most of the ester bonds in the ESS molecule were also hydrolyzed and only a small part of multi-hydroxyl fatty acid was still esterified onto sucrose.

TABLE 4

The Degradation Time of the Natural Acid Crosslinked ESS Networks in NaOH Aqueous Solutions

| Sample | Degradation time at 90° C. | | | Degradation time at RT |
|---|---|---|---|---|
| | (0.1M) | (1M) | (10M) | (1M) |
| E-C1 | 1150 min | 39 min | ~25 min | 2 d |
| E-C0.8 | 1270 min | 56 min | ~25 min | 4 d |
| E-C0.65 | 2710 min | 103 min | ~45 min | 6 d |
| E-C0.5 | ~3 d | 182 min | ~45 min | 44 d |
| E-C0.35 | ~3 d | 224 min | ~45 min | >60 d |
| E-C0.2 | ~3 d | 167 min | 20~30 min | 32 d |
| E-M | 384 min | 19 min | ~15 min | 1 d |
| E-T | 523 min | 34 min | ~15 min | 2 d |
| E-ML | ~3 d | 235 min | 20~30 min | >60 d |
| E-G | 87 min | 13 min | 10 min | 1 d |

Note: The degradation times in 0.1 M and 1 M NaOH aqueous solutions are the times for the samples to be completely dissolved or forming a dispersion in the solutions (transparent solutions or emulsions without obvious particles or small pieces). But the degradation times in NaOH aqueous solution (10 M) are the times for the samples becoming small pieces.

Figure 14:
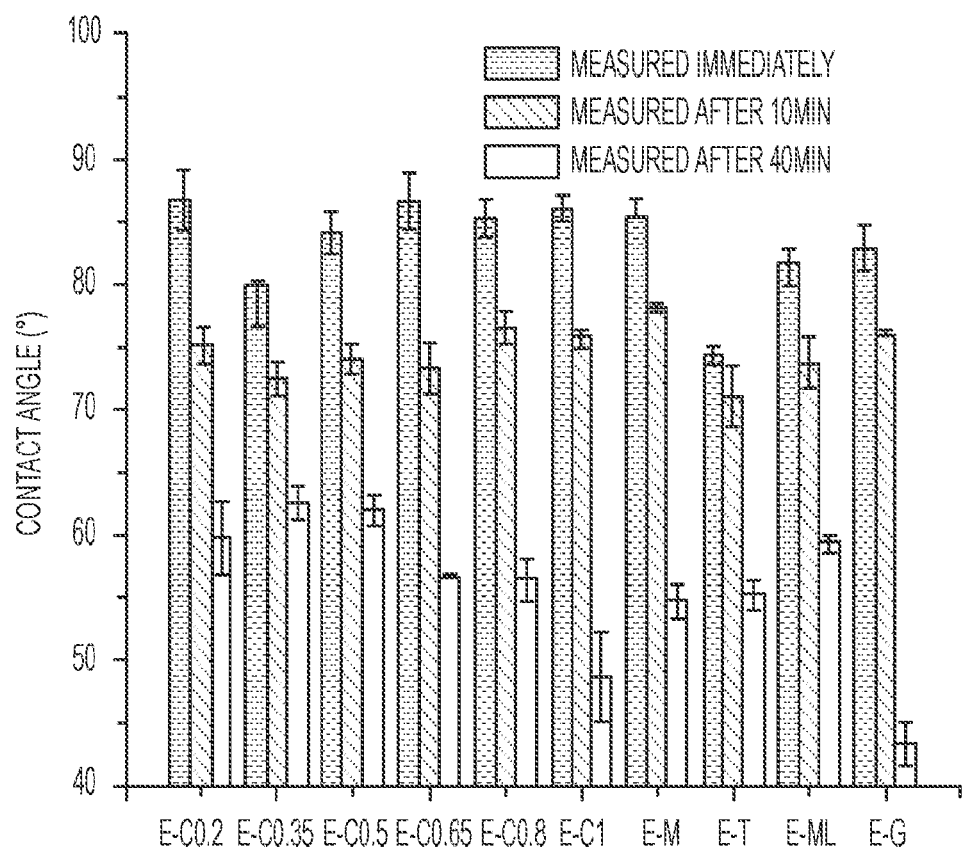
FIG. 14 depicts the water contact angle of the water-soluble multifunctional carboxylic acids crosslinked ESS networks at different times after dispensing water droplet.

From the degradation data in Table 4, it is apparent that thermosets having different compositions showed different degradability in aqueous base. Other research on degradable thermosets has shown that the degradation was greatly influenced by the crosslink density of the thermosets.[40] The degradability of thermosets utilizing a hydrolysis mechanism was also correlated to the hydrophilicity of the networks.[44] Thermosets having low crosslink density and strong hydrophilicity will degrade fast. Thus, the water wettability, which is a measure of the influence of hydrophilicity on the hydrolysis, was determined using static contact angle measurements. As can be seen from FIG. 14, E-G showed the highest water wettability, plus it has the lowest crosslinking density (Table 2), corresponding to the fastest degradation. E-M showed relatively low water wettability and crosslinking density, it could be also degraded rapidly. The high water wettability also enabled the higher crosslinked E-C1 to degrade easily. E-T also showed high degradability due to good water wettability seen from the lowest initial contact angle and lower contact angle after 40 min. E-C0.5, E-C0.35, E-C0.2, and E-ML exhibited relatively slower degradation rate than other samples. E-C0.2 and E-ML had low crosslinking density, so their slow degradation was mainly due to the low water wettability. And E-C0.35 and E-C0.5 have relatively high crosslinking density and low water wettability, leading to the slower degradation.

Example 2—Reactivity of Dicarboxylic Acid Oligomers with ESS

2.1 Materials

Epoxidized sucrose soyate (ESS) was prepared as previously reported.[17a,41] The epoxide equivalent weight is 246 g/mol. Maleic anhydride and 1,4:3,6-dianhydro-D-sorbitol (isosorbide) were purchased from Sigma-Aldrich. 1,3-Propandiol was provided by DuPont Tate & Lyle Bioproducts Company, LLC. Maleic anhydride, isosorbide and 1,3-propandiol were used as received.

2.2 Synthesis of Maleic Anhydride-Isosorbide Trimer (MI)

7.00 g (71.4 mmol) maleic anhydride and 5.22 g (35.7 mmol) isosorbide were placed in a 20 mL vial, magnetically stirred and heated to 105° C., and kept at 105° C. for 5 h. For this reaction, neither prolonging the reaction time nor adjusting the reaction temperature could result in maleic anhydride being completely reacted. Thus, purification was needed for this product. It was washed with a mixture of ethyl acetate and petroleum ether (1:1) two times, then the product MI with the yield of around 45% was obtained after being washed with ethyl acetate followed by drying at 100° C. for 5 h in a vacuum oven. The synthetic route is shown in Scheme 2.

2.3 Synthesis of Maleic anhydride-1,3-propanediol Trimer (MP)

8.00 g (81.6 mmol) maleic anhydride and 3.10 g (40.8 mmol) 1,3-propanediol were placed in a 20 mL vial, magnetically stirred and heated to 105° C., and kept at 105° C. for 5 h. The product MP was obtained as is and required no further purification. The synthetic route is also shown in Scheme 2.

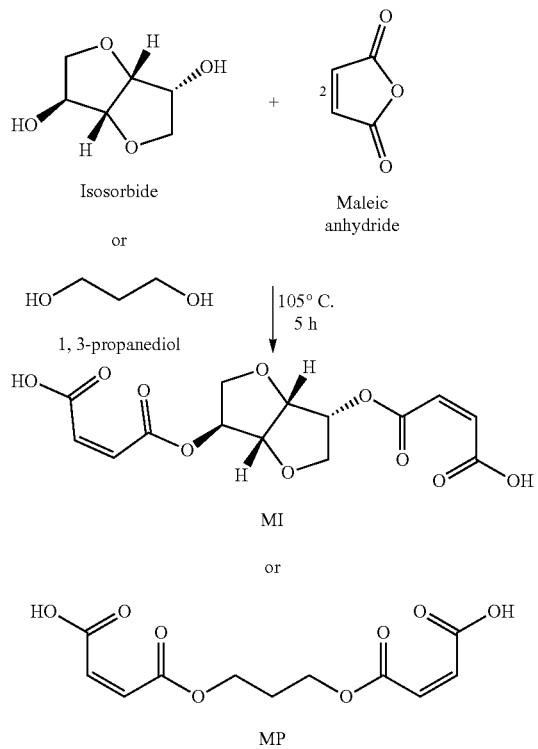

Scheme 2. Synthetic route of maleic anhydride-isosorbide trimer (MI) and maleic anhydride-1,3-propanediol trimer (MP).

2.4 Preparation of the Cross-Linked Networks

The compositions of the cross-linked networks are shown in Table 5. For all the samples, the dicarboxylic acids were dissolved in a solvent mixture comprised of ethanol and deionized water, followed by mixing with ESS. Due to the poor miscibility between hydrophobic ESS and hydrophilic synthesized dicarboxylic acids, phase separation would occur if solvent evaporation occurred. Thus, pre-reaction is needed for all the samples. In order to reduce the possibility of side reactions between ethanol and ESS and dicarboxylic acids, the pre-reaction was carried out at low temperature (50° C.) for 5 h to obtain a transparent solution. Then, the mixtures were coated on cleaned smooth finish steel panels (QD panels from Q-panel) and cleaned glass panels using a draw-down bar with gaps of 3 mils and 8 mils, respectively. Finally, they were cured at 75° C. for 3, 120° C. for 1 h, and 150° C. for 2 h. The cured thermosets with thickness of 22-31 μm on the steel panels were used for coatings property determination. The films with thickness of 75-110 μm were carefully removed from the glass panels and used to examine the thermal, mechanical and degradation properties.

TABLE 5

The feed compositions for the cured samples.

| Sample | Cross-linker | Epoxy group/—COOH/ ethanol/$H_2O$ (molar ratio) |
|---|---|---|
| EMI1 | MI | 1/1/3/1 |
| EMI0.8 | MI | 1/0.8/2.4/0.8 |
| EMI0.5 | MI | 1/0.5/1.5/0.5 |
| EMP1 | MP | 1/1/3/1 |
| EMP0.8 | MP | 1/0.8/2.4/0.8 |
| EMP0.5 | MP | 1/0.5/1.5/0.5 |

2.5 Characterization Methods

The infrared spectra (FT-IR) were recorded with a Nicolet 6700 FT-IR (Thermoscientific, America). $^1$H NMR measurements were performed on a 400 MHz AVANCE III Bruker NMR spectrometer (Bruker, Switzerland) with DMSO-$d^6$ as a solvent. The gel content of the films was measured using acetone extraction. The cured samples (free films with the thickness of 0.09-0.13 mm) weighing between 0.1 g and 0.3 g were precisely weighed (W1), extracted with acetone for 48 h under reflux using a Soxhlet extractor, and finally dried at 82° C. under vacuum for 6 h and weighed (W2). The gel content was calculated as W2/W1. Coating properties: The thickness of the cured coatings on smooth finish steel substrate was the average of 10 measurements taken using a Byko-Test 8500 coating thickness gauge at different locations on the film, and the uncertainty is the standard deviation. Pencil hardness, Konig pendulum hardness, and reverse impact resistance were measured according to ASTM D 3363, ASTM D 4366 and ASTM D 2794, respectively. The adhesion of the coatings was evaluated using the ASTM D 3359 crosshatch adhesion method. Methyl ethyl ketone (MEK) double rub test was carried out following ASTM D 5402 modified by using cheesecloth wrapped around a hammerhead. Mandrel bend test was carried out based on ASTM D 522, and the results were reported as the elongation of the coating at cracking. Dynamic mechanical analysis (DMA) was carried out with a TA Instruments Q800 DMA in tension mode to measure the dynamic mechanical properties of the thermoset films. Rectangular samples with dimensions of 12 mm (length)×5 mm (width)×0.08-0.12 mm (thickness) were prepared and tested from 0° C. to 140° C. at a heating rate of 5° C. min$^{-1}$ and a frequency of 1 Hz. Thermogravimetric analysis (TGA) was carried out using a TA Instruments Q500. The non-isothermal degradation was investigated by TGA at a heating rate of 20° C./min from 25° C. to 700° C. under air atmosphere. Chemical degradation was determined by immersing the free films in 1 M NaOH aqueous solution or 1 M HCl aqueous solution at 50° C. The degradation times were recorded. The degradation times are the times for the samples to be completely dissolved in the solutions (forming transparent solutions). For the degradation in HCl aqueous solution, the samples could not be degraded completely, so the weight loss was recorded based on the weight of the samples before and after degradation.

2.6 Results and Discussion

Figure 15:
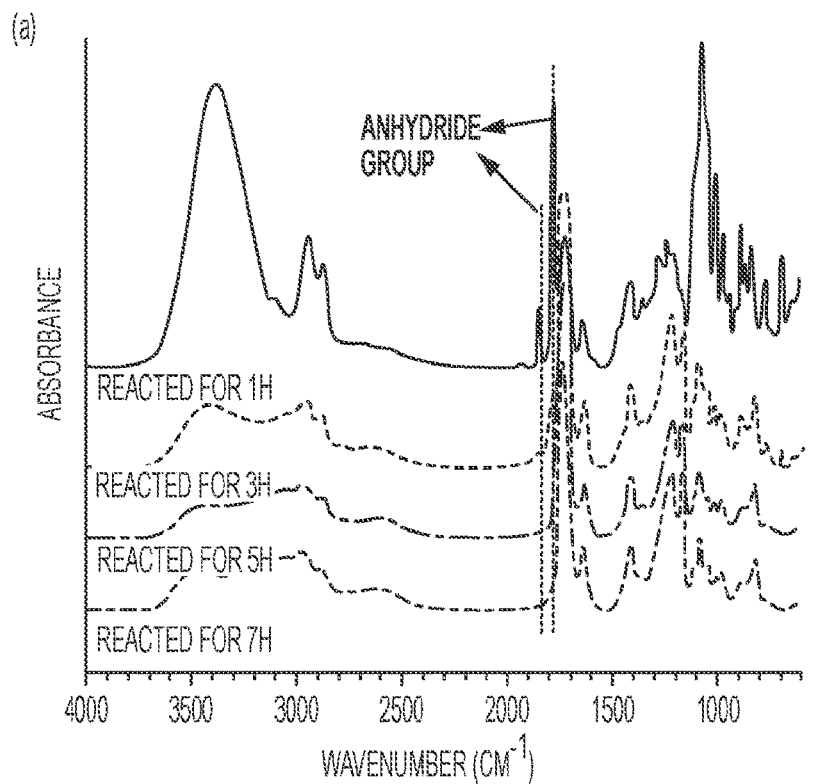
FIG. 15(a) depicts the FTIR spectrum of the MI (a) system at different reaction times.
FIG. 15(b) depicts the FTIR spectrum of the MP (b) system at different reaction times.
Figure 15:
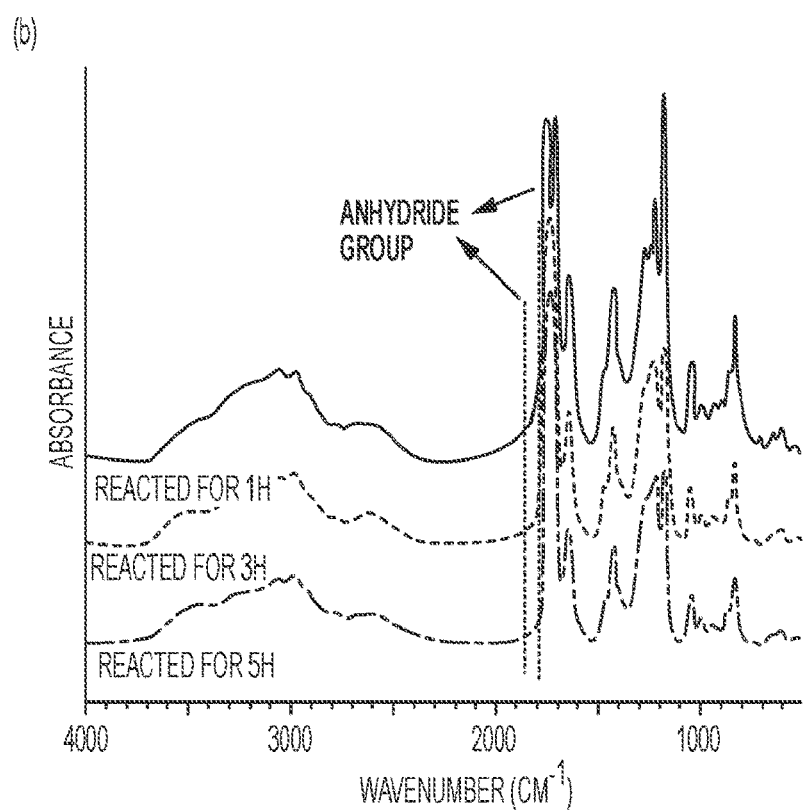

Synthesis and Characterization of MI and MP: The synthesis of MI and MP was monitored by FTIR. As shown in FIG. 15(a), with the prolonged reaction time of the MI system, the strength of the peak of the anhydride group decreased, but after 5 h, further prolonging the reaction time did not decrease the peak strength of anhydride. So the reaction time was set at 5 h. However, the peak for the anhydride group was still present in the FTIR spectrum; approximately 16.7% maleic anhydride (calculated from the integration area of proton peak of double bond for maleic anhydride and proton peak of double bond from MI (FIG. 16(b)) did not react and remained in the MI system, so purification was needed for the MI reaction system. In contrast, for the MP system, the peak of the anhydride group cannot be seen in the FTIR spectrum after reacting for 5 h, as shown in FIG. 15(b), and only around 1% maleic anhydride still remained in the MP reaction systems calculated from the $^1$H NMR spectrum (FIG. 16(d)); thus MP was used as is without any purification.

Figure 16:
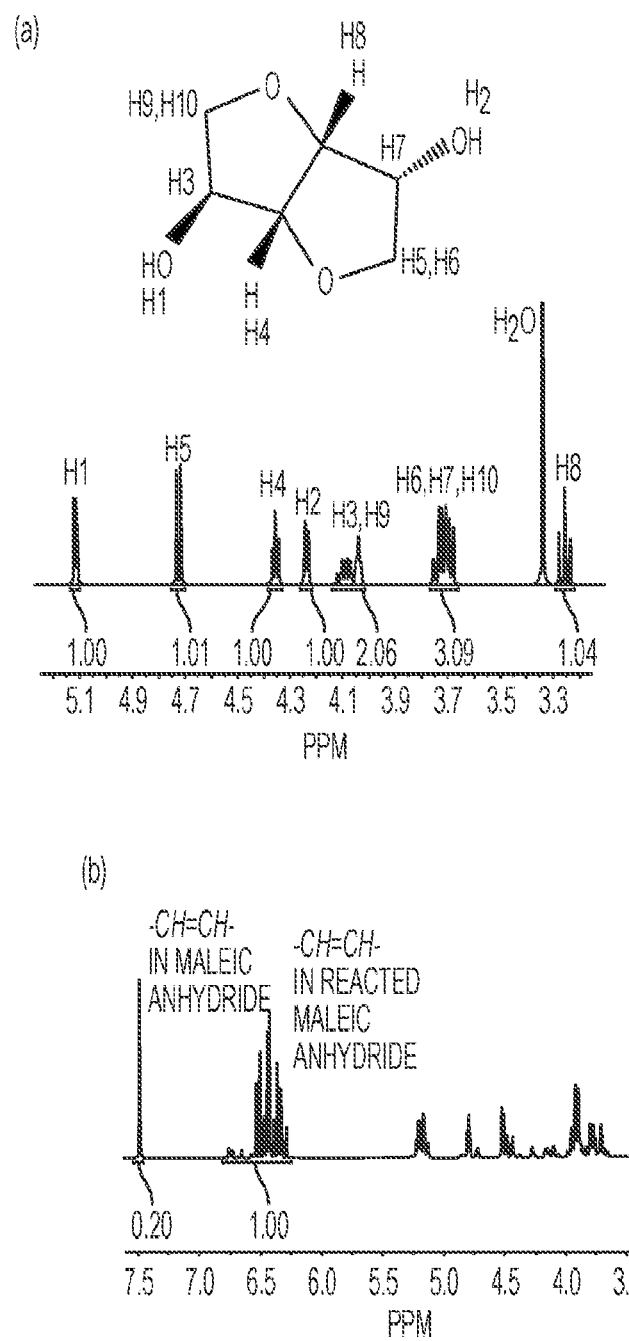
FIG. 16(a) depicts the $^1$H NMR spectrum of isosorbide.
FIG. 16(b) depicts the $^1$H NMR spectrum of MI without purification.
FIG. 16(c) depicts the $^1$H NMR spectrum of purified MI.
FIG. 16(d) depicts the $^1$H NMR spectrum of MP.
Figure 16:
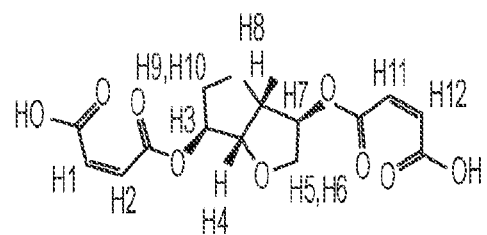
Figure 16:
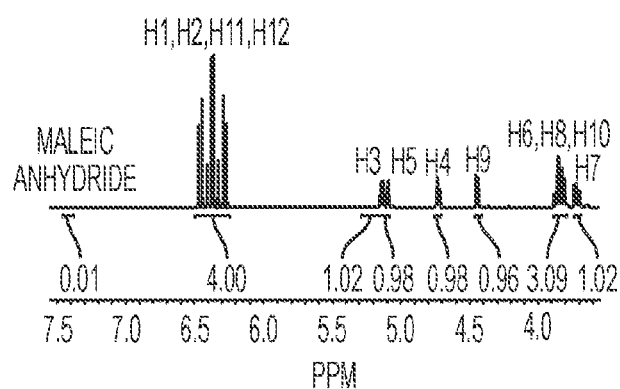
Figure 16:
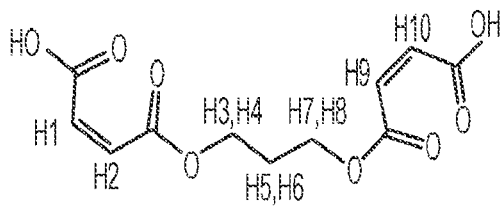
Figure 16:
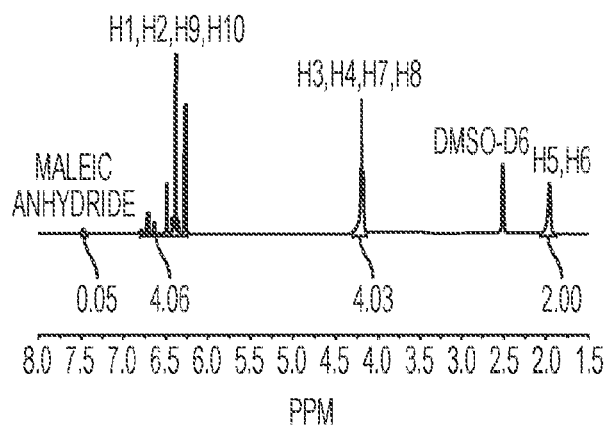

The chemical structures of MI and MP were determined by $^1$H NMR. As shown in FIG. 16(c), the spectrum of purified MI shows the characteristic peaks of protons H1, H2, H11, H12 on the double bonds of —COO—CH=CH—COOH at 6.25-6.47 ppm, and peaks of protons H3-H10 on the isosorbide rings at 5.09-5.15 ppm, 4.71-4.74 ppm, 4.44-4.45 ppm, 3.80-3.85 ppm, and 3.70-3.73 ppm. The peaks belonging to isosorbide (FIG. 16(a)) at 4.03-4.12 ppm and 4.23-4.24 ppm and peak belonging to maleic anhydride (FIG. 16(b)) at 7.47 ppm have almost disappeared. In the $^1$H NMR spectrum of MP (FIG. 16(d)), the peaks at 6.27-6.79 ppm from the protons H1, H2, H9, H10 on the double bonds of —COO—CH=CH—COOH, the peaks at 4.16-4.25 ppm due to the protons H3, H4, H7 and H8 of —O—$CH_2$—$CH_2$—$CH_2$—O—, and the peaks around 1.93-2.01 ppm are ascribed to the protons H5 and H6 of —O—$CH_2$—$CH_2$—$CH_2$—O—. These results indicate that the target compounds were synthesized successfully.

2.7 Curing Process and Properties of the Cured Coatings

As shown in Example 1 hydrolysis of the epoxy groups may happen slowly during curing for the epoxy/carboxylic acid/$H_2O$ systems.[10] In this example, besides $H_2O$, there is ethanol in the curing system, so alcoholysis between ethanol and the epoxy groups may also slowly happen. These two side reactions, especially alcoholysis, could impact the properties of the final cross-linked networks. In order to reduce the chance of these two side reactions, the pre-reaction of the curing systems was carried out at a low temperature (50° C.). As in Example 1, the reactivity of the carboxylic acid group towards the epoxy group depends on the acidity of the carboxylic acid.[10] Conjugated with the carbon-carbon double bond, the carboxylic acid group of MI and MP might possess high reactivity since the acidity of maleic acid is very high ($pK_{a1}$=1.9). This is likely the reason that MI and MP have high reactivity toward ESS, and can react with ESS at 50° C., which can be reflected from the phenomenon of the transition of the initial two-phase MI/ESS/$H_2O$/ethanol system and MP/ESS/$H_2O$/ethanol system into one homogeneous phase after pre-reacting at 50° C. for 5 h. In contrast, when using succinic anhydride instead of maleic anhydride in the reaction with isosorbide, the obtained dicarboxylic acid showed much lower reactivity as the acidity of succinic acid is weaker ($pK_{a1}$=4.2), and the system could not become homogeneous even when pre-reacted with ESS with the assistance of $H_2O$ and ethanol at 50° C. for 72 h.

Figure 17:
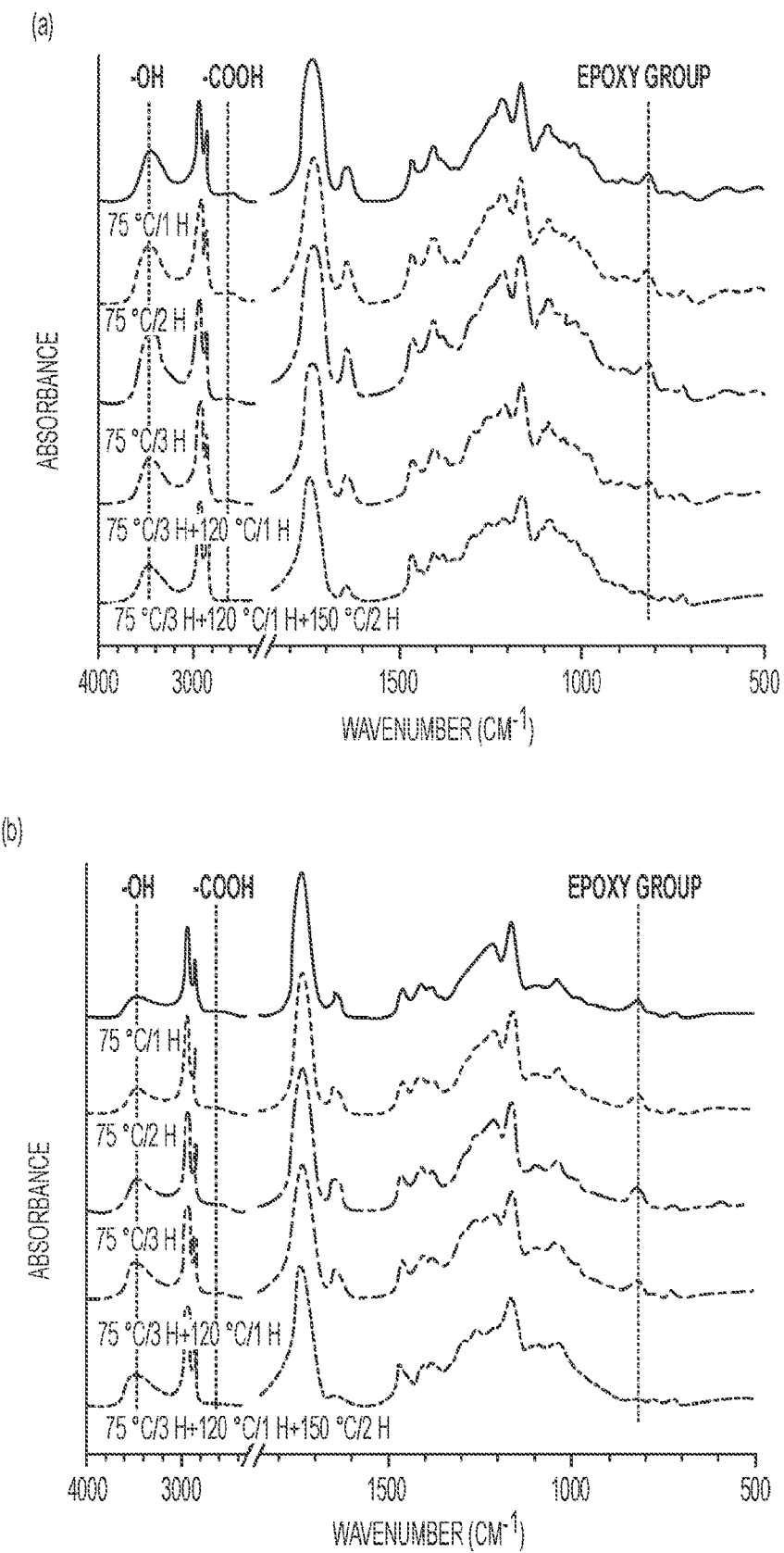
FIG. 17(a) depicts the FTIR spectrum of EMI1 systems after different curing steps.
FIG. 17(b) depicts the FTIR spectrum of EMP1 systems after different curing steps.

FTIR was used to monitor the chemical reactions during the curing process. From the FTIR spectra of the MI system as a function of curing time (FIG. 17(a)), it can be seen that during the first step (75° C./3 h) of the curing process, the peak strength for —OH increased, which was produced from the ring-opening reaction between carboxyl groups and epoxy groups (Scheme 3a). The peak strength for the epoxy groups showed no obvious change, which meant that a significant amount of epoxy groups remained after this curing step. During the second and third curing steps (120° C./1 h and 150° C./2 h), peak strength for —OH, —COOH and epoxy groups all decreased, and after the third curing step, the peaks for —COOH and epoxy groups are almost gone. These results are indicative of the occurrence of the further ring-opening reaction of epoxy groups with —COOH and esterification between —OH from the first curing step and —COOH (Scheme 3b). Also, the FTIR spectra of the sample cured at 75° C./3 h, 120° C./1 h and 150° C./2 h, indicate a shoulder peak around 1800 cm$^{-1}$ which was assigned to the characteristic stretch vibration of anhydride groups. This demonstrates the occurrence of anhydride formation (Scheme 3c). A similar curing process is observed for the MP system as shown in the FTIR spectra of MP systems after different curing times (FIG. 17(b)).

Scheme 3. Reactions occurring during the curing process.

Figure 18:
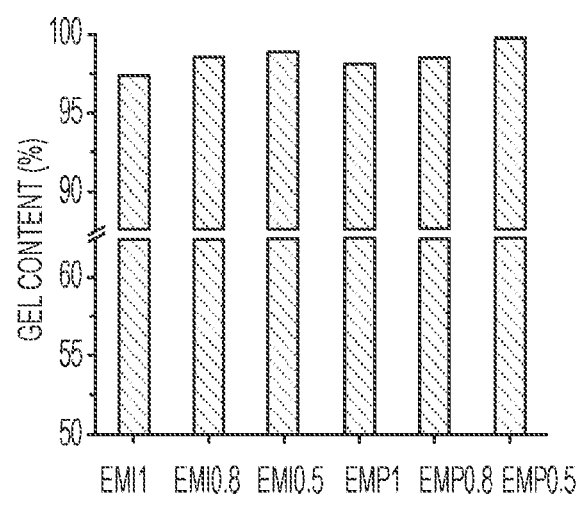
FIG. 18 depicts the gel content of MI and MP cross-linked ESS networks.

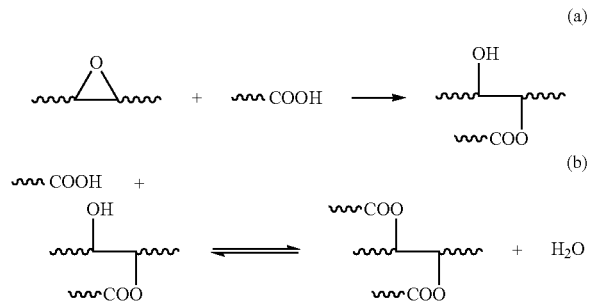

well-crosslinked system and has a direct relationship to the properties of the thermoset. Thus, the gel content of the thermosets was examined and shown in FIG. 18. It is clear that all the systems show a high gel content of 97.4%-99.7%, which indicates that ESS is well cured by MI and MP with water and ethanol assistance. For both MI and MP cross-linked systems, the gel content decreased slightly with increasing diacid content. This might be due to the fact that ESS has a large number of reactive epoxy groups, so ESS is easy to be incorporated into the cross-linked network; while the diacids only have two reactive groups. A small amount of the diacids might not react with ESS and remain in the networks, which can then be extracted by acetone during the Soxhlet extraction, resulting in the observed decreased gel content with the increase of diacid content.

Coating properties of the thermosets: The coatings properties of the thermosets including Konig pendulum hardness, pencil hardness, solvent resistance, adhesion, impact strength and mandrel bend were investigated and the data are shown in Table 6. Both Konig pendulum hardness and pencil hardness of the samples increased with an increase in the cross-linker content. The MI cross-linked systems showed high Konig pendulum hardness of 168-189 s, higher than that of the MP cross-linked systems of 135-155 s. The two systems showed similar pencil hardness which reflect the scratch resistance of the coatings. Adhesion of the coatings is also extremely high, as high as 5B, due to the polar groups introduced from the cross-linkers and the hydroxyl groups produced during the curing process. In addition, all of the samples showed excellent solvent resistance with MEK double rubs above 400, outstanding toughness and flexibility with reverse impact strength of higher than 168 in-lb, and elongation at break during mandrel bends of higher than 28% (the highest grade; no break during bending). These results have shown that high hardness, excellent flexibility as well as outstanding solvent resistance and adhesion could be achieved for these thermoset coatings.

TABLE 6

Coatings properties of the MI or MP cross-linked ESS networks.

| Sample | Thickness (μm) | König pendulum hardness (s) | Pencil hardness | MEK double rubs | Crosshatch adhesion (5B = best) | Reverse impact (in-lb) | Mandrel bend (elongation at break) |
|---|---|---|---|---|---|---|---|
| EMI1 | 23.1 | 189 | 3H | >400 | 5B | >168 | >28% |
| EMI0.8 | 23.3 | 182 | 2H | >400 | 4B | >168 | >28% |
| EMI0.5 | 22.2 | 168 | H | >400 | 4B | >168 | >28% |
| EMP1 | 26.9 | 155 | 3H | >400 | 5B | >168 | >28% |
| EMP0.8 | 29.1 | 142 | 2H | >400 | 5B | >168 | >28% |
| EMP0.5 | 31.0 | 135 | H | >400 | 3B | >168 | >28% |

-continued

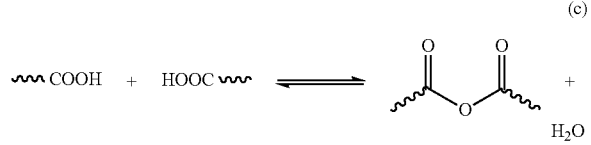

Gel content of MI and MP cross-linked ESS networks: Gel content is a crucial indicator of the formation of a Conformational transitions of isosorbide structure: The possible conformational transitions of the isosorbide structure were determined using a molecular dynamics simulation using Molecular Operating Environment (MOE) combined with Marvin Sketch Module and Merck Molecular Force Field (MMFF64). For clarity, the isosorbide moiety was used instead of MI or MI cross-linked ESS networks. The chemical structure of isosorbide was drawn in molecular operating environment (MOE) by Chemical Computing Group (CCG),[42] the stereochemistry was corrected and the structure was energy minimized. The optimized structure was saved as a molfile for further studies. The isosorbide (molfile) was imported into Marvin Sketch module of Marvin Bean suite of Chemaxon[43] for the generation of conformers and calculation of the energy for each conformation. Merck Molecular Force Field (MMFF64)[44] as implemented in Marvin sketch module was used for the generation of conformers and computation of energies of the conformers. During the molecular dynamics simulation, the atoms and bonds of the isosorbide structure were constantly moving, and the conformation of the isosorbide structure also transformed unceasingly. The energy minimized conformation of isosorbide has a calculated energy of 93.42 kcal/mol. Other confirmations have calculated energies of, for example, 93.71 kcal/mol, 96.6 kcal/mol. 97.68 kcal/mol, 98.52 kcal/mol, 101.15 kcal/mol, 101.27 kcal·mol and 102.41 kcal/mol. With increasing the energy, the conformation of isosorbide changed. This molecular dynamics simulation suggested that the conformational transitions of isosorbide structure could occur with external force or applied energy. The conformational transitions might absorb the external energy[24-26] and improve molecular motions of the materials[22], resulting in the excellent flexibility reflected from the reverse impact and mandrel bend results of the coatings (Table 6).

Figure 19:
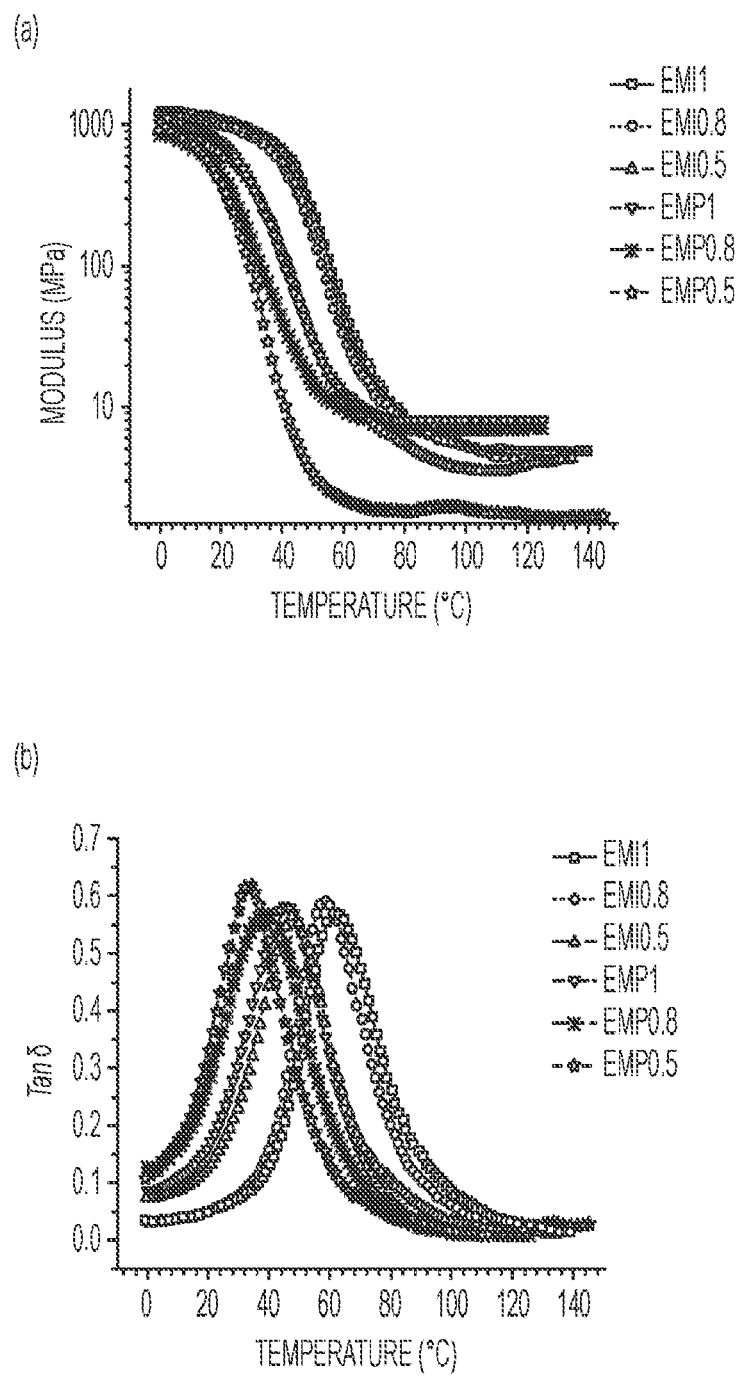
FIG. 19(a) depicts the DMA curves of the MI cross-linked ESS networks.
FIG. 19(b) depicts the DMA curves of the MP cross-linked ESS networks.

Thermal and mechanical properties of the MI and MP cross-linked ESS networks: DMA was used to determine the glass transition temperature ($T_g$), modulus and cross-link density of the cured samples. The curves of tan δ and storage modulus of the cured samples as a function of temperature are shown in FIG. 19. The peaks of the tan δ curves were used to determine the $T_g$ of the cured samples. The modulus values at $T_g$+60° C. were utilized to calculate the cross-link density of the cured samples according to the following equation[45]

$$v_e = \frac{E'}{3RT}$$

where E' is the storage modulus of the thermoset in the rubbery plateau region, R is the gas constant, and T is the absolute temperature. As presented in Table 7, EMI1 possesses a high modulus of 997 MPa at room temperature (25° C.), corresponding to its high hardness (189 s) even higher than the hardest sample (141 s) reported in Example 1.[10] For the MP systems, the highest modulus is 551 MPa. This shows that at room temperature, the isosorbide structure is rigid and can impart high hardness and stiffness to the materials. The $T_g$ values of the cross-linked thermosets not only relate to the rigidity of the chain segments but are also related to the cross-link density. Although the cross-link density values of the MI systems are low, even lower than the MP systems due to the longer chain length and higher steric hindrance of MI than MP, the MI systems exhibited $T_g$ as high as 62.5° C. for EMI1, much higher than the MP systems. Meanwhile, both MI and MP cross-linked samples show increasing $T_g$, modulus and cross-link density with increasing content of MI and MP, respectively. However, compared with the hardest sample (tartaric acid cross-linked ESS network) with the $T_g$ value of 95° C. in our previous work,[10] the $T_g$ values of MI cross-linked ESS networks are much lower. This suggests that with the application of external force or energy, the segmental mobility of the MI cross-linked ESS networks is much easier than that of tartaric acid cross-linked ESS network, corresponding to the excellent flexibility of the MI cross-linked ESS networks. The superior segmental mobility of the MI cross-linked ESS networks might be from the lower cross-link density of the networks and the conformational transitions of the isosorbide structure.

TABLE 7

DMA data of the MI and MP cross-linked ESS networks.

| Sample | $T_g$ (° C.) | Modulus at 25° C. (MPa) | Modulus at $T_g$ + 60° C. (MPa) | Cross-link density (mol/m³) |
|---|---|---|---|---|
| EMI1 | 62.5 | 997 | 4.74 | 566 |
| EMI0.8 | 58.3 | 903 | 4.34 | 524 |
| EMI0.5 | 47.9 | 508 | 3.51 | 438 |
| EMP1 | 45.6 | 551 | 7.88 | 991 |
| EMP0.8 | 38.9 | 273 | 6.98 | 897 |
| EMP0.5 | 33.1 | 209 | 2.02 | 264 |

Figure 20:
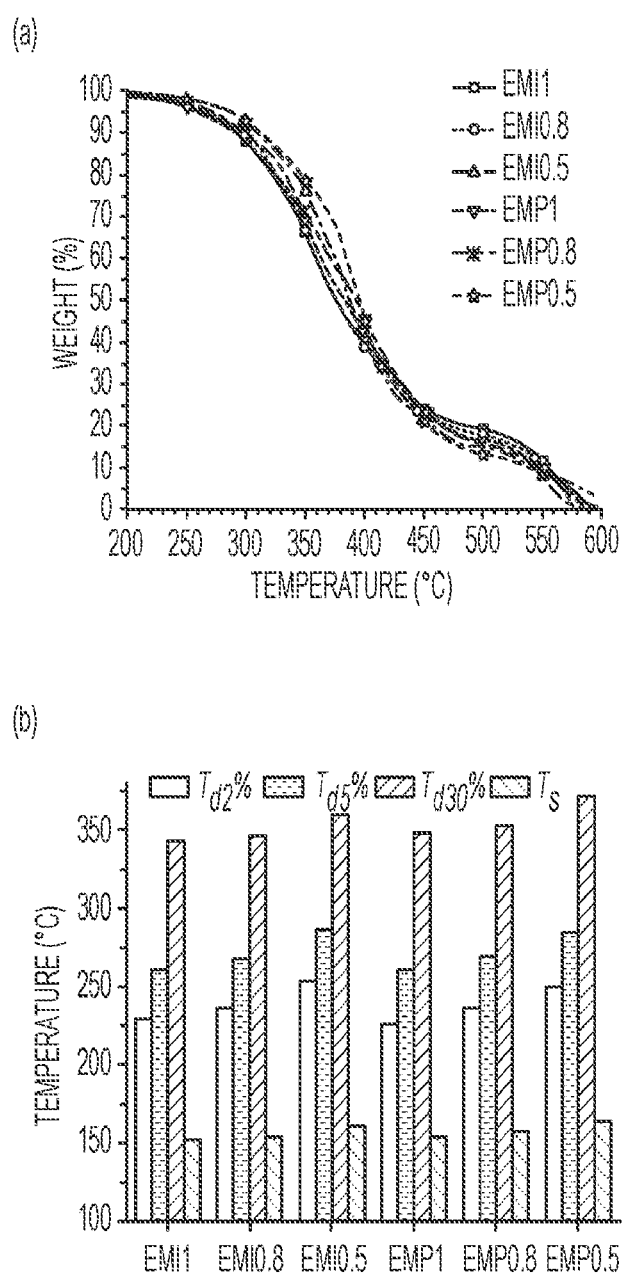
FIG. 20(a) depicts the TGA curves of the MI and MP cross-linked ESS networks (a).
FIG. 20(b) depicts the data for the MI and MP cross-linked ESS networks.

Thermal degradation of the cross-linked networks: TGA was used to investigate the thermal degradation of the cured thermoset samples. FIG. 20a shows the non-isothermal degradation curves of all the samples under air atmosphere, and the initial degradation temperatures (the temperature for 2% weight loss, $T_{d2\%}$) are summarized in FIG. 20b. It can be seen that both MI cross-linked systems and MP cross-linked systems showed low $T_{d2\%}$ of 226.9° C. for EMP1 to 253.9° C. for EMI0.5. To specify the thermal stability of the cured samples, the statistic heat-resistant index ($T_s$) was determined from the temperature of 5% weight loss ($T_{d5\%}$) and of 30% weight loss ($T_{d30\%}$) of the sample, as measured by TGA. The statistic heat-resistant temperature ($T_s$) is calculated by:[31]

$$T_S=0.49 \ [T_{d5\%}+0.6(T_{d30\%}-T_{d5\%})]$$

As can be seen from FIG. 20b, the $T_s$ of EMI1 is as low as 152.3° C. which is much lower than cured bisphenol A epoxy resins (around 180° C.).[31a] This is suggestive of the better thermal degradability of MI or MP cross-linked ESS systems than the bisphenol A epoxy systems. It can be also seen that with the increasing amount of the MI or MP used in the networks, both $T_{d2\%}$ and $T_s$ decreased. This might indicate that the introduction of MI or MP incorporated thermally labile linkages such as secondary ester bonds from the ring-opening reaction between epoxy groups and carboxylic acid groups. Thermosets with secondary ester bonds are more easily decomposed with thermal treatment than thermosets with primary ester linkages.[46] It has also been reported that the optimal temperature for safe rework operations of thermosets is 200-250° C.;[33a,47] accordingly these natural acid cross-linked ESS thermosets have potential to be used as reworkable thermosetting resins.

Figure 21:
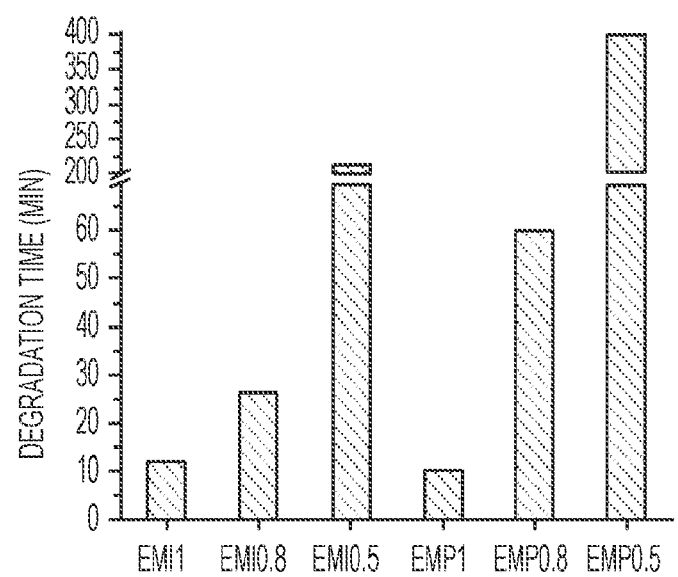
FIG. 21 depicts the degradation time of MI and MP cross-linked ESS networks in 1 M NaOH aqueous solution at 50° C.
Figure 22:
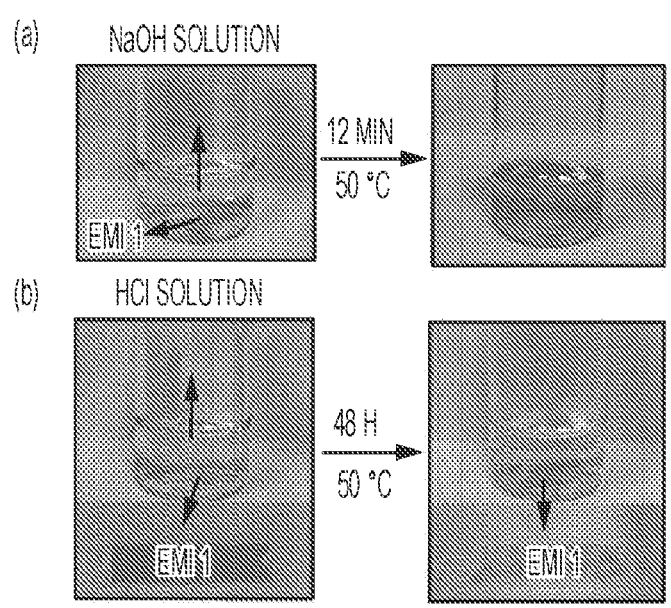
FIG. 22(a) depicts the appearance of EMI1 before and after immersing in 1 M NaOH aqueous solution.
FIG. 22(b) depicts the appearance of EMI1 before and after immersing in 1 M HCl aqueous solution.

Chemical degradation of the cross-linked networks: The chemical degradation of the samples were examined by immersion in 1 M NaOH aqueous solution or 1 M hydrochloric acid aqueous solution at 50° C. As shown in FIG. 21, all the samples could be degraded and completely dissolved in aqueous base during 400 min. For EMI1 and EMP1, the degradation times are 12 min and 10 min, respectively. Visually, the 1 M NaOH aqueous solution containing a solid EMI1 became one homogeneous phase after being heated at 50° C. for 12 min as can be seen in FIG. 22. And for both MI and MP cross-linked samples, the degradation time decreased with increasing MI or MP content. The degradability of the thermosets via a hydrolysis mechanism has close ties to the cross-link density and hydrophilicity.[36] Thermosets having low cross-link density and strong hydrophilicity will degrade fast.[10] Thus, the excellent degradability of the samples was due to the low cross-link density of the cured samples, and the increased hydrophilicity after introducing the MI or MP into the ESS systems. However, in contrast, the samples are stable in acidic conditions. Taking EMI1 as an example, there was no obvious appearance change and only 3% weight loss after immersing EMI1 in 1 M hydrochloric acid at 50° C. for 48 h, as shown in FIG. 22.

2.8 Conclusions

Degradable thermosets with high hardness and excellent flexibility were designed and prepared from renewable resources. Dicarboxylic acid MI was synthesized by the reaction of isosorbide and maleic anhydride without catalyst. Due to the carbon-carbon double bond, the carboxylic acid groups of MI showed high reactivity and could be used to cross-link epoxidized sucrose soyate with the assistance of $H_2O$ and ethanol. The investigation of the curing process illustrated the reactions that occurred during each curing step. The thermosets showed an excellent combination of properties with high hardness of 189 s (Konig pendulum hardness) and 3 H (pencil hardness), excellent flexibility of >168 in-lb (reverse impact) and >28% (mandrel bend, no break after bending), as well as outstanding adhesion (5B) and solvent resistance (MEK double rub >400 times). The high hardness is related to the high modulus of the thermosets due to the rigidity of the isosorbide ring; and the excellent flexibility might be from the good segmental mobility of the cross-linked network due to the lower cross-link density and possible conformational transitions of the isosorbide structure. The thermosets could be degraded rapidly and completely dissolved in 1 M NaOH aqueous solution in 12 min at 50° C. but were stable in 1 M HCl aqueous solution. The thermosets are also thermally degradable. The results demonstrate a promising method to produce green thermosets having excellent flexibility and good hardness.

REFERENCES (1) Montarnal, D.; Capelot, M.; Tournilhac, F.; Leibler, L. Silica-like malleable materials from permanent organic networks. *Science* 2011, 334, 965-968.

(2) Fogelstrom, L.; Malmstrom, E.; Johansson, M.; Hult, A. Hard and flexible nanocomposite coatings using nanoclay-filled hyperbranched polymers. *ACS Appl. Mater. Interfaces* 2010, 2, 1679-1684.

(3) (a) Ma, S. Q.; Liu, X. Q.; Jiang, Y. H.; Tang, Z. B.; Zhang, C. Z.; Zhu, J. *Green Chem.* 2013, 15, 245-254. (b) Auvergne, R.; Caillol, S.; David, G.; Boutevin, B.; Pascault, J-P. *Chem. Rev.* 2014, 114, 1082-1115.

(4) (a) Shen, L.; Haufe, J.; Patel, M. K. *Report for European Polysaccharide Network of Excellence (EPNOE) and European Bioplastics* 2009, 243. (b) Chen, G. Q.; Patel, M. K. *Chem. Rev.* 2012, 112, 2082-2099. (c) Halden, R. U. *Annu. Rev. Public Health* 2010, 31, 179-194.

(5) Garcia, J. M.; Jones, G. O.; Virwani, K.; McCloskey, B. D.; Boday, D. J.; ter Huurne, G. M.; Horn, H. W.; Coady, D. J.; Bintaleb, A. M.; Alabdulrahman, A. M. S.; Alsewailem, F.; Almegren, H. A. A.; Hedrick, J. L. *Science* 2014, 344, 732-735.

(6) (a) Xanthos, M. *Science* 2012, 337, 700-702. (b) Rochman, C. M.; Browne, M. A.; Halpern, B. S.; Hentschel, B. T.; Hoh, E.; Karapanagioti, H. K.; Rios-Mendoza, L. M.; Takada, H.; Teh, S.; Thompson, R. C. *Nature* 2013, 494, 169-171.

(7) Jung, Y. H.; Chang, T. H.; Zhang, H. L.; Yao, C. H.; Zheng, Q. F.; Yang, V. W.; Mi, H. Y.; Kim, M.; Cho, S. J.; Park, D. W.; Jiang, H.; Lee, J.; Qiu, Y. J.; Zhou, W. D.; Cai, Z. Y.; Gong, S. Q.; Ma, Z. Q. *Nat. Commun.* 2015, 6.

(8) Oliveux, G.; Dandy, L. O.; Leeke, G. A. *Prog. Mater. Sci.* 2015, 72, 61-99.

(9) Raquez, J. M.; Deléglise, M.; Lacrampe, M. F.; Krawczak, P. *Prog. Polym. Sci.* 2010, 35, 487-509.

(10) US Provisional Application 62/218,749; Ma, S. Q.; Webster, D. C. Naturally occurring acids as cross-linkers to yield VOC-free, high performance, fully bio-based, degradable thermosets. *Macromolecules* 2015, 48, 7127-7137.

(11) (a) Babu, R.; O'Connor, K.; Seeram, R. Prog. Biomater. 2013, 2, 1-16. (b) Faruk, O.; Bledzki, A. K.; Fink, H.-P.; Sain, M. *Prog. Polym. Sci.* 2012, 37, 1552-1596. (c) Chu, S.; Majumdar, A. *Nature* 2012, 488, 294-303.

(12) Chrysanthos, M.; Galy, J.; Pascault, J.-P. *Polymer* 2011, 52, 3611-3620.

(13) Zhang, Y.; Wang, R.; Hua, Y.; Baumgartner, R.; Cheng, J. *ACS Macro Lett.* 2014, 3, 693-697.

(14) Lei, Z. Q.; Xiang, H. P.; Yuan, Y. J.; Rong, M. Z.; Zhang, M. Q. *Chem. Mat.* 2014, 26, 2038-2046.

(15) Guo, B.; Finne-Wistrand, A.; Albertsson, A.-C. *Biomacromolecules* 2011, 12, 2601-2609.

(16) Rajendran, S.; Raghunathan, R.; Hevus, I.; Krishnan, R.; Ugrinov, A.; Sibi, M. P.; Webster, D. C.; Sivaguru, J. *Angew. Chem.-Int. Edit.* 2015, 54, 1159-1163.

(17) (a) Pan, X.; Sengupta, P.; Webster, D. C. *Green Chem.* 2011, 13, 965-975. (b) Pan, X.; Webster, D. C. *Macromol. Rapid Commun.* 2011, 32, 1324-1330.

(18) Pan, X.; Sengupta, P.; Webster, D. C. *Biomacromolecules* 2011, 12, 2416-2428.

(19) Gopferich, A. *Biomaterials* 1996, 17, 103-114.

(20) (a) Penniston, K. L.; Nakada, S. Y.; Holmes, R. P.; Assimos, D. G. *J. Endourol.* 2008, 22, 567-570. (b) Soyer, Y.; Koca, N.; Karadeniz, F. *J. Food Compos. Anal.* 2003, 16, 629-636. (c) Eisele, T. A.; Drake, S. R. *J. Food Compos. Anal.* 2005, 18, 213-221.

(21) (a) Altuna, F. I.; Pettarin, V.; Williams, R. J. J. *Green Chem.* 2013, 15, 3360-3366. (b) Gogoi, P.; Boruah, M.; Sharma, S.; Dolui, S. K. *ACS Sustain. Chem. Eng.* 2015, 3, 261-268. (c) Gogoi, P.; Horo, H.; Khannam, M.; Dolui, S. K. *Ind. Crop. Prod.* 2015, 76, 346-354.

(22) (a) Chen, L. P.; Yee, A. F.; Goetz, J. M.; Schaefer, J. Molecular structure effects on the secondary relaxation and impact strength of a series of polyester copolymer glasses. *Macromolecules* 1998, 31, 5371-5382. (b) Chen, L. P.; Yee, A. F.; Moskala, E. J. The molecular basis for the relationship between the secondary relaxation and mechanical properties of a series of polyester copolymer glasses. *Macromolecules* 1999, 32, 5944-5955.

(23) (a) Li, X. Y.; Yee, A. F. Design of mechanically robust high Tg polymers: Mechanical properties of glassy poly (ester carbonate)s with cyclohexylene rings in the backbone. *Macromolecules* 2004, 37, 7231-7239. (b) Liu, J. W.; Yee, A. F. Enhancing plastic yielding in polyestercarbonate glasses by 1,4-cyclohexylene linkage addition. *Macromolecules* 1998, 31, 7865-7870.

(24) (a) Gryshchuk, O.; Karger-Kocsis, J. Influence of the type of epoxy hardener on the structure and properties of interpenetrated vinyl ester/epoxy resins. *J. Polym. Sci. Pol. Chem.* 2004, 42, 5471-5481. (b) Karger-Kocsis, J.; Gryshchuk, O.; Jost, N. Toughness response of vinylester/epoxy-based thermosets of interpenetrating network structure as a function of the epoxy resin formulation: Effects of the cyclohexylene linkage. *J. Appl. Polym. Sci.* 2003, 88, 2124-2131.

(25) Rief, M.; Oesterhelt, F.; Heymann, B.; Gaub, H. E. Single molecule force spectroscopy on polysaccharides by atomic force microscopy. *Science* 1997, 275, 1295-1297.

(26) Zhang, L.; Shams, S. S.; Wei, Y.; Liu, X.; Ma, S.; Zhang, R.; Zhu, J. Origin of highly recoverable shape memory polyurethanes (SMPUs) with non-planar ring structures: a single molecule force spectroscopy investigation. *J. Mater. Chem. A* 2014, 2, 20010-20016.

(27) (a) Noordover, B. A. J.; van Staalduinen, V. G.; Duchateau, R.; Koning, C. E.; van, B.; Mak, M.; Heise, A.; Frissen, A. E.; van Haveren, Co- and terpolyesters based on isosorbide and succinic acid for coating applications: synthesis and characterization. J. *Biomacromolecules* 2006, 7, 3406-3416. (b) Yoon, W. J.; Oh, K. S.; Koo, J. M.; Kim, J. R.; Lee, K. J.; Im, S. S. Advanced polymerization and properties of biobased high Tg polyester of isosorbide and 1,4-cyclohexanedicarboxlyic acid through in-situ acetylation. *Macromolecules* 2013, 46, 2930-2940.

(28) (a) Fenouillot, F.; Rousseau, A.; Colomines, G.; Saint-Loup, R.; Pascault, J. P. Polymers from renewable 1,4:3,6-dianhydrohexitols (isosorbide, isomannide and isoidide): A review. *Prog. Polym. Sci.* 2010, 35, 578-622. (b) Jacquel, N.; Saint-Loup, R.; Pascault, J.-P.; Rousseau, A.; Fenouillot, F. Bio-based alternatives in the synthesis of aliphatic-aromatic polyesters dedicated to biodegradable film applications. *Polymer* 2015, 59, 234-242. (c) Goerz, O.; Ritter, H. Polymers with shape memory effect from renewable resources: crosslinking of polyesters based on isosorbide, itaconic acid and succinic acid. *Polym. Int* 2013, 62, 709-712. (d) Feng, X. H.; East, A. J.; Hammond, W. B.; Zhang, Y.; Jaffe, M. Overview of advances in sugar-based polymers. *Polym. Adv. Technol.* 2011, 22, 139-150. (e) Sadler, J. M.; Toulan, F. R.; Nguyen, A.-P. T.; Kayea, R. V., Ill; Ziaee, S.; Palmese, G. R.; La Scala, J. J. Isosorbide as the structureal component of bio-based unsaturated polyesters for use as thermosetting resins. *Carbohydr. Polym.* 2014, 100, 97-106. (f) Modjinou, T.; Versace, D.-L.; Abbad-Andallousi, S.; Bousserrhine, N.; Babinot, J.; Langlois, V.; Renard, E. Antibacterial networks based on isosorbide and linalool by photoinitiated process. *ACS Sustain. Chem. Eng.* 2015, 3, 1094-1100.

(29) Schuster, H.; Rios, L. A.; Weckes, P. P.; Hoelderich, W. F. *Appl. Catal. A-Gen.* 2008, 348, 266-270.

(30) Bruice, P. Y., *organic chemistry. Fifth ed.;* 2007; p 453.

(31) (a) Scanlan, J. *J. Polym. Sci.* 1960, 43, 501-508. (b) Hill, L. W. *Prog. Org. Coat.* 1997, 31, 235-243.

(32) Kovash, C. S.; Pavlacky, E.; Selvakumar, S.; Sibi, M. P.; Webster, D. C. *Chemsuschem* 2014, 7, 2289-2294.

(33) (a) Ma, S. Q.; Liu, X. Q.; Fan, L. B.; Jiang, Y. H.; Cao, L.; Tang, Z. B.; Zhu, J. *Chemsuschem* 2014, 7, 555-562. (b) You, G.; Cheng, Z.; Tang, Y.; He, H. *Ind. Eng. Chem. Res.* 2015, 54, 7309-7319. (34) Yang, S.; Chen, J.-S.; Körner, H.; Breiner, T.; Ober, C. K.; Poliks, M. D. *Chem. Mat.* 1998, 10, 1475-1482.

(35) (a) Morell, M.; Ramis, X.; Ferrando, F.; Yu, Y.; Serra, A. *Polymer* 2009, 50, 5374-5383. (b) Morell, M.; Erber, M.; Ramis, X.; Ferrando, F.; Voit, B.; Serra, A. *Eur. Polym. J.* 2010, 46, 1498-1509. (c) Morell, M.; Fernandez-Francos, X.; Ramis, X.; Serra, A. *Macromol. Chem. Phys.* 2010, 211, 1879-1889.

(36) Li, H.; Wang, L.; Jacob, K.; Wong, C. P. *J. Polym. Sci. Pol. Chem.* 2002, 40, 1796-1807.

(37) Chen, J. S.; Ober, C. K.; Poliks, M. D. *Polymer* 2002, 43, 131-139.

(38) (a) Giménez, R.; Fernández-Francos, X.; Salla, J. M.; Serra, A.; Mantecón, A.; Ramis, X. *Polymer* 2005, 46, 10637-10647. (b) Tomuta, A. M.; Fernández-Francos, X.; Ferrando, F.; Ramis, X.; Serra, À. *Polym. Adv. Technol.* 2013, 24, 962-970. (c) Miyagawa, T.; Shimizu, M.; Sanda, F.; Endo, T. *Macromolecules* 2005, 38, 7944-7949. (d) Hashimoto, T.; Meiji, H.; Urushisaki, M.; Sakaguchi, T.; Kawabe, K.; Tsuchida, C.; Kondo, K. *J. Polym. Sci. Pol. Chem.* 2012, 50, 3674-3681. (e) Shirai, M.; Morishita, S.; Okamura, H.; Tsunooka, M. *Chem. Mat.* 2002, 14, 334-340. (f) Adachi, M.; Okamura, H.; Shirai, M. *Chem. Lett.* 2013, 42, 1056-1058.

(39) (a) Shirai, M.; Kawaue, A.; Okamura, H.; Tsunooka, M. *Chem. Lett.* 2002, 940-941. (b) Shirai, M.; Kawaue, A.; Okamura, H.; Tsunooka, M. *Chem. Mat.* 2003, 15, 4075-4081. (c) Okamura, H.; Tajima, Y.; Shirai, M. *J. Photopolym Sci. Technol.* 2005, 18, 715-718.

(40) (a) Liu, Q.; Jiang, L.; Shi, R.; Zhang, L. *Prog. Polym. Sci.* 2012, 37, 715-765. (b) Tesoro, G. C.; Sastri, V. *J. Appl. Polym. Sci.* 1990, 39, 1425-1437.

(41) (a) Palmese, G. R; La Scala, J. J.; Sadler, J. M.; Lam, A.-P. T. Renewable bio-based (meth)acrylated monomers as vinyl ester cross-linkers. 2014, U. S. Pat. Appl. 2014/0249285. (b) Zenner, M. D.; Madbouly, A. A; Chen, J. S.; Kessler, M. R. Unexpected tackifiers from isosorbide. 2015, *ChemSusChem*, 8, 448-451.

(42) Monono, E. M.; Bahr, J. A.; Pryor, S. W.; Webster, D. C.; Wiesenborn, D. P. Optimizing process parameters of epoxidized sucrose soyate synthesis for industrial scale production. *Org. Process Res. Dev.* 2015, 19, 1683-1692.

(43) Molecular Operating Environment (MOE), 2013.08; Chemical Computing Group Inc., 1010 Sherbooke St. West, Suite #910, Montreal, QC, Canada, H3A 2R7, 2015.

(44) Marvin sketch 15.11.16, 201n (2015), ChemAxon, Budapest, Hungary, (http://www.chemaxon.com).

(45) Halgren, T. A.; Nachbar, R. B. Merck molecular force field. IV. Conformational energies and geometries for MMFF94. *J. Comput. Chem.* 1996, 17, 587-615.

(46) (a) Aouf, C.; Nouailhas, H.; Fache, M.; Caillol, S.; Boutevin, B.; Fulcrand, H. Multi-functionalizatoin of gallic acid. Synthesis of a novel bio-based epoxy resin. *Eur. Polym. J.* 2013, 49, 1185-1195. (b) Chiu, Y.-C.; Chou, I. C.; Tseng, W.-C.; Ma, C.-C. M. Preparation and thermal properties of diglycidylether sulfone epoxy. *Polym. Degrad. Stabil.* 2008, 93, 668-676.

(47) (a) Morell, M.; Erber, M.; Ramis, X.; Ferrando, F.; Voit, B.; Serra, A. New epoxy thermosets modified with hyperbranched poly(ester-amide) of different molecular weight. *Eur. Polym. J.* 2010, 46, 1498-1509. (b) Morell, M.; Fernandez-Francos, X.; Ramis, X.; Serra, A. Synthesis of a new hyperbranched polyaminoester and its use as a reactive modifier in anionic curing of DGEBA thermosets. *Macromol. Chem. Phys.* 2010, 211, 1879-1889.

The claimed invention is:

1. A curable bio-based thermosetting composition comprising a solution of: a pre-reaction product of a) at least one highly-functional bio-based epoxy resin and b) at least one carboxylic acid crosslinker; and a solvent selected from the group consisting of water, a $C_1$-$C_3$ alcohol, and mixtures thereof;

wherein the a) at least one highly-functional bio-based epoxy resin is the reaction product of: a polyol having 4 or more hydroxyl groups, an ethylenically unsaturated fatty acid, and an optional saturated fatty acid, wherein at least one ethylenically unsaturated group of the ethylenically unsaturated fatty acid is oxidized to an epoxy group;

wherein the b) at least one carboxylic acid crosslinker is selected from the group consisting of a water-soluble multifunctional carboxylic acid, an anhydride of said water-soluble multifunctional carboxylic acid, a dicarboxylic acid oligomer from a melt reaction between a diol and a dicarboxylic acid or the anhydride of said dicarboxylic acid, and mixtures thereof;

wherein the pre-reaction product of a) and b) is formed by reacting a) and b) at a first temperature in the presence of the solvent, yielding the solution; and wherein the curable bio-based thermosetting composition is thermally curable by continuing the reaction of the pre-reaction product in the solution at a second temperature, not less than the first temperature, to form a fully cured composition.

2. The curable bio-based thermosetting composition of claim 1, wherein:

a) the polyol having 4 or more hydroxyl groups is selected from pentaerithritol, di-trimethylolpropane, di-pentaerithritol, tri-pentaerithritol, sucrose, glucose, mannose, fructose, galactose, raffinose, copolymers of styrene and allyl alcohol, polyglycidol, and poly(dimethylpropionic acid); and b) the ethylenically unsaturated fatty acid and the optional saturated fatty acid are a vegetable or seed oil.

3. The curable bio-based thermosetting composition of claim 2, wherein:

a) the polyol having 4 or more hydroxyl groups is sucrose; and b) the vegetable or seed oil is selected from corn oil, castor oil, soybean oil, safflower oil, sunflower oil, linseed oil, tall oil fatty acid, tung oil, vernonia oil, and mixtures thereof.

4. The curable bio-based thermosetting composition of claim 1, wherein the at least one highly-functional bio-based epoxy resin is selected from an epoxidized sucrose ester resin.

5. The curable bio-based thermosetting composition of claim 4, wherein the epoxidized sucrose ester resin is epoxidized sucrose soyate.

6. The curable bio-based thermosetting composition of claim 1, wherein the at least one carboxylic acid crosslinker is a water-soluble multifunctional carboxylic acid selected from the group consisting of citric acid, malic acid, tartaric acid, oxalic acid, malonic acid, glutaric acid, succinic acid, maleic acid (cis-butenedioic acid), fumaric acid (trans-butenedioic acid), glutamic acid, itaconic acid, citraconic acid, mesaconic acid, aspartic acid, oxalacetic acid, adipic acid, pimelic acid, azelaic acid, suberic acid, 1,2,3-propanetricarboxylic acid, cis-aconitic acid, trans-aconitic acid, isocitric acid lactone, (+)-garcinia acid, 4,4'-phosphinicobis(butane-1,3-dicarboxylic acid), chelidamic acid, chelidonic acid, trans-β-hydromuconic acid, trans-1,2-cyclohexanedicarboxylic acid, oxirane-2,3-dicarboxylic acid, 2,3-pyridinedicarboxylic acid, 2,4-pyridinedicarboxylic acid, 2,5-pyridinedicarboxylic acid, phenylmalonic acid, homophthalic acid, sebacic acid, 1,11-undecanedicarboxylic acid, dodecanedioic acid, hexadecanedioic acid, phthalic acid, isophthalic acid, terephthalic acid, trimesic acid, 1,2,4-benzenetricarboxylic acid, 2,5-furandicarboxylic acid, and mixtures thereof.

7. The curable bio-based thermosetting composition of claim 6, wherein the water-soluble multifunctional carboxylic acid is selected from the group consisting of citric acid, malonic acid, tartaric acid, malic acid, oxalic acid, glutaric acid, and mixtures thereof.

8. The curable bio-based thermosetting composition of claim 1, wherein the at least one carboxylic acid crosslinker is a dicarboxylic acid oligomer from a melt reaction between a diol and a dicarboxylic acid or the anhydride of said dicarboxylic acid.

9. The curable bio-based thermosetting composition of claim 8, wherein:

the diol is selected from the group consisting of diethyleneglycol (DEG), 2-butyl-2-ethyl-1,3-propane diol (BEPD), ethylene glycol, 1,2-propane diol, 1,3-propane diol, 2-methyl-1,3-propane diol, 1,4-butanediol, 2,3-butanediol, 1,5-pentanediol, 1,6-hexanediol, 1,4-cyclohexanedimethanol, 1,3-cyclohexanedimethanol, neopentyl glycol (NPG), a 1,4:3,6 dianhydrohextol and mixtures thereof; and the dicarboxylic acid is selected from the group consisting of oxalic acid, maleic acid, malonic acid, succinic acid, oleic acid, glutaric acid, adipic acid, pimelic acid, phthalic acid, acid anhydrides thereof.

10. The curable bio-based thermosetting composition of claim 8, wherein:

the diol is selected from the group consisting of diethyleneglycol (DEG), ethylene glycol, 1,3-propane diol, isosorbide and mixtures thereof; and the dicarboxylic acid is maleic acid or maleic acid anhydride.

11. The curable bio-based thermosetting composition of claim 10, wherein the diol is isosorbide.

12. The curable bio-based thermosetting composition of claim 8, wherein the molar ratio of carboxylic acid to hydroxyl groups, prior to the melt reaction, is 2:1.

13. The curable bio-based thermosetting composition of claim 1, wherein the curable composition is substantially free of organic solvents.

14. The curable bio-based thermosetting composition of claim 1, wherein the chemical equivalent ratio of epoxy to carboxylic acid, prior to the reaction of the pre-reaction product, ranges from about 1:0.1 to about 1:1.3.

15. The curable bio-based thermosetting composition of claim 1, wherein the chemical equivalent ratio of epoxy to carboxylic acid, prior to the reaction of the pre-reaction product, ranges from about 1:0.5 to about 1:1.1.

16. The curable bio-based thermosetting composition of claim 1, wherein the first temperature is 40° C. and the second temperature is 40° C. or higher.

17. An object coated with the curable, bio-based thermosetting composition of claim 1.

18. A cured bio-based thermoset resin synthesized from the curable bio-based thermosetting composition of claim 1, wherein the composition is thermally cured by continuing the reaction of the pre-reaction product in the solution at a second temperature, not less than the first temperature, to form a fully cured composition.

19. A method for producing a cured bio-based thermoset resin from the curable bio-based thermosetting composition of claim 1 comprising: continuing the reaction of the pre-reaction product in the solution by thermally curing at a second temperature, not less than the first temperature, to form a fully cured composition.

* * * * *